(12) United States Patent
Konotopskyi et al.

(10) Patent No.: US 10,492,068 B1
(45) Date of Patent: Nov. 26, 2019

(54) BIDIRECTIONAL SECURITY SENSOR COMMUNICATION SYSTEM

(71) Applicant: AJAX SYSTEMS INC., Wilmington, DE (US)

(72) Inventors: Oleksandr Konotopskyi, Kiev (UA); Sergey Pyannikov, Kiev (UA); Oleksandr Tantsiura, Kiev (UA)

(73) Assignee: Ajax Systems Inc., Wilmington, DE (US)

( * ) Notice: Subject to any disclaimer, the term of this patent is extended or adjusted under 35 U.S.C. 154(b) by 252 days.

(21) Appl. No.: 15/474,283

(22) Filed: Mar. 30, 2017

Related U.S. Application Data

(60) Provisional application No. 62/315,364, filed on Mar. 30, 2016.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04W 12/06* | (2009.01) |
| *H04L 29/08* | (2006.01) |
| *H04W 72/04* | (2009.01) |
| *H04W 84/18* | (2009.01) |

(52) U.S. Cl.
CPC ......... *H04W 12/06* (2013.01); *H04L 63/0428* (2013.01); *H04L 63/08* (2013.01); *H04L 69/324* (2013.01); *H04W 72/044* (2013.01); *H04W 84/18* (2013.01)

(58) Field of Classification Search
USPC .......................................................... 726/3
See application file for complete search history.

(56) References Cited

U.S. PATENT DOCUMENTS

| | | | | |
|---|---|---|---|---|
| 2008/0253327 | A1* | 10/2008 | Kohvakka | H04W 16/14 370/330 |
| 2010/0226342 | A1* | 9/2010 | Colling | H04W 56/002 370/336 |
| 2013/0242905 | A1* | 9/2013 | Rasband | H04W 56/0015 370/329 |
| 2017/0251467 | A1* | 8/2017 | Dame | H04W 4/38 |

* cited by examiner

*Primary Examiner* — Jeffrey C Pwu
*Assistant Examiner* — Samuel Ambaye
(74) *Attorney, Agent, or Firm* — Bardmesser Law Group

(57) ABSTRACT

A method for long range communications using sensors with bidirectional communication capability includes installing a plurality of sensors configured to communicate with a central node configured to send and receive packets in working slots on two frequencies; selecting a frequency with the strongest signal from each particular sensor; and avoiding collisions between the two-way sensors by changing working slots of the two-way sensors in each new frame by (a) creating a super-frame comprising multiple ordinary frames; (b) clocking all five multiple frames through; (c) returning the working slots to their initial positions; (d) creating a new super-frame; and (e) changing the working slot position throughout the new super-frame. Bidirectional communication guarantees that reception will be confirmed, or increases the chances that the signal will be received. Thus, it is possible to transfer information both ways, i.e., it is possible to write data (settings, etc.) into sensors.

19 Claims, 28 Drawing Sheets

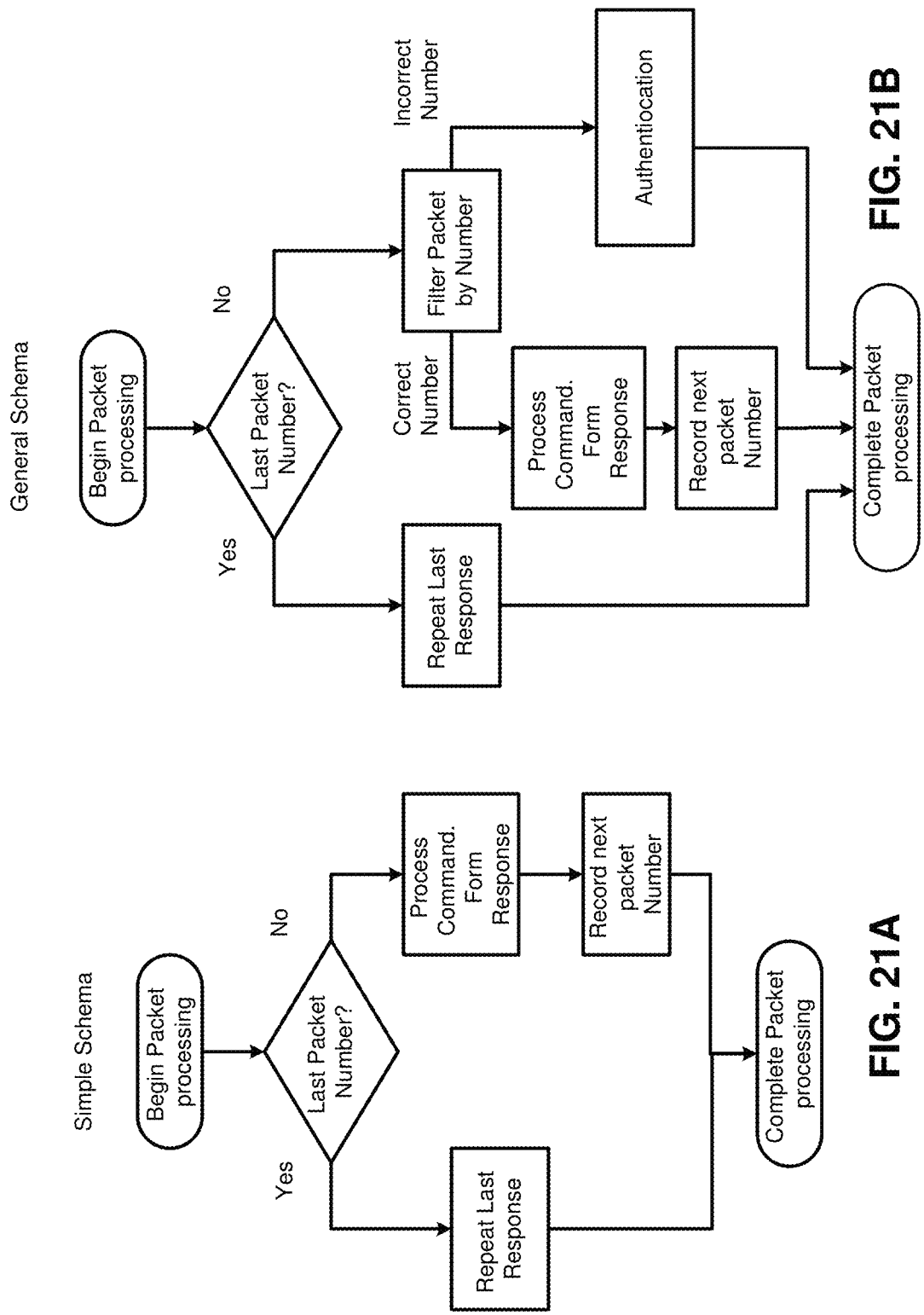

BIDIRECTIONAL SECURITY SENSOR COMMUNICATION SYSTEM

CROSS REFERENCE TO RELATED APPLICATIONS

This application is a non-provisional of U.S. Provisional Patent Application No. 62/315,364, filed on Mar. 30, 2016.

BACKGROUND OF THE INVENTION

Field of the Invention

This invention relates to a wireless communications system, and, more particularly, to a reliable long range communication system for security sensors using a two-way security sensor.

Description of the Related Art

Modern wireless communications systems, such as Wi-Fi, Bluetooth™ and Z-Wave suffer from a relatively short operational range (up to 100 m for Wi-Fi, about 10 m for Bluetooth™), high energy consumption and low reliability. Currently, there is no widely accepted radio technology for use with security sensors, which provides for long range communications (up to 2,000 m) while having reasonably low energy consumption.

Accordingly, it is desired to have a reliable and efficient long range radio communication system with security sensors.

SUMMARY OF THE INVENTION

Accordingly, the present invention is related to a system for reliable and efficient long range radio communication system for use with security sensors that substantially obviates one or more of the disadvantages of the related art.

In one embodiment, a system designed for security sensors in a localized area is provided. Two-way communication guarantees that the reception will be confirmed to the sender, and that the receiver receives the signal, or at least it increases the chances that the signal will be received, even in cases of high radio noise and interference. So, the system makes it possible to transfer information both ways (bidirectionally), i.e., it is possible to write data (settings, etc.) into sensors, as well as receive data from them.

In another embodiment, a method for long range communications using sensors with bidirectional communication capability includes installing a plurality of sensors configured to communicate with a central node configured to send and receive packets in working slots on two frequencies; selecting a frequency with the strongest signal from each particular sensor; and avoiding collisions between the two-way sensors by changing working slots of the two-way sensors in each new frame by (a) creating a super-frame comprising multiple ordinary frames; (b) clocking all five multiple frames through; (c) returning the working slots to their initial positions; (d) creating a new super-frame; and (e) changing the working slot position throughout the new super-frame.

Optionally, the packets are encrypted. Optionally, the method includes cyclically shifting the working slots forward by a variable delay, which is set by the central node from a pre-defined range in a pseudo-random order. Optionally, receipt of the packets is confirmed by a recipient to a sender. Optionally, the packet includes a header, a command, a data field and a checksum. Optionally, the header includes a packet number, an address of the sender, an address of the recipient. Optionally, the packet includes service data, including a preamble, a sync word, a network number, a data count and a modem checksum. Optionally, the encryption does not change a byte count of the packet. Optionally, a length of the slots is changed pseudorandomly. Optionally, each slot has a work period and a service period, and wherein a length of the work period is changeable at an expense of a length of the service period. Optionally, wherein each sensor operates in a sleep mode, waking up only when its slot is up for broadcast. Optionally, the slots are desynchronized by working interleaving between the frames. Optionally, the working slot is cyclically shifted. Optionally, the packets are repeated at one of the two frequencies. Optionally, the two frequencies change over time. Optionally, the two frequencies are selected using a channel number and a current frame number. Optionally, each sensor manages its own packeting numbering sequence. Optionally, alarms generated by the sensors are numbered. Optionally, when a conflicting number of the packet from a sensor is detected, an authentication command is sent to the sensor.

In another embodiment, a system for long range communications using sensors with bidirectional communication capability includes a plurality of sensors configured to communicate with a central node configured to send and receive packets in working slots on two frequencies; the central node selects a frequency with the strongest signal; and wherein collisions between the two-way sensors are avoided by changing working slots of the two-way sensors in each new frame by (a) creating a super-frame comprising multiple ordinary frames; (b) clocking all five multiple frames through; (c) returning the working slots to their initial positions; (d) creating a new super-frame; and (e) changing the working slot position throughout the new super-frame.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 21A illustrates a simplified diagram where only repeat packet numbers are described;

FIG. 21B represent a general flowchart, which shows an order of processing;

DETAILED DESCRIPTION OF THE PREFERRED EMBODIMENTS

Reference will now be made in detail to the preferred embodiments of the present invention, examples of which are illustrated in the accompanying drawings.

In one aspect of the invention, a system of security sensors in a localized area is provided. Two-way communication guarantees that the reception will be confirmed to the sender, and that the receiver receives the signal, or at least it increases the chances that the signal will be received, even in cases of high radio noise or interference. So, the system makes it possible to transfer information both ways (bidirectionally), i.e., it is possible to write data (settings, etc.) into sensors.

According to an exemplary embodiment, a special packet format (transport level) is provided. A packet contains a header, a command, a data field, and a checksum. It has an ability to add some service data. The packet header contains the addresses of both the sender and the receiver, as well as the packet number needed to differentiate between two identical packets received in immediate succession. The general structure of an exemplary packet is:

Header;
Command;
Data;
Packet checksum.

After the packet is generated, it is encrypted. Encryption does not change the initial byte count in the packet. The packet checksum is used to check whether decryption upon reception is correct.

Figure 2:
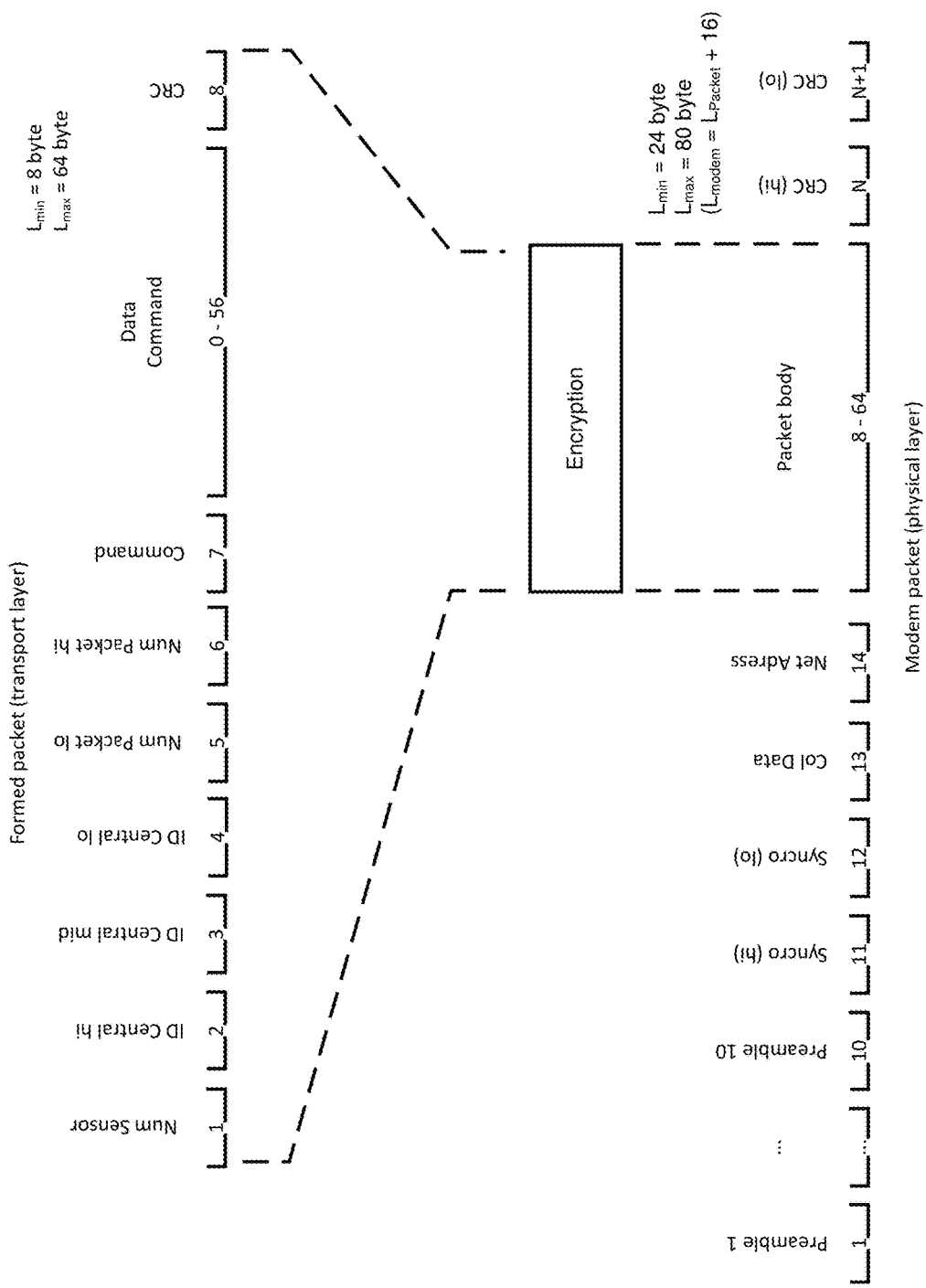
FIG. 2 shows a schematic overview of a packet in accordance with the exemplary embodiment.

FIG. 2 shows a schematic overview of a packet in accordance with the exemplary embodiment.

When the packet is broadcast, the transceiver chip adds the following service data to it:

Preamble;
Sync word;
Data count;
Network number; and
Modem checksum.

| Field | Qty of bytes | Purpose |
| --- | --- | --- |
| Num Sensor | 1 | The sensor's number in the system, which is assigned by the central controller, node or server on registration and used to address packets immediately from/to a specified sensor. The number 0 is reserved for system purposes, being used for broad-band broadcasting and during sensor initialization as well. |
| ID Central | 3 | The unique central node ID, which is assigned at manufacturing, guaranteeing that there is no other central node with the same ID. This ID number is transmitted to each sensor to inform it about its master central controller's "name". It is also used by the sensors to single out data packets sent by their "own" central controller. |

-continued

| Field | Qty of bytes | Purpose |
|---|---|---|
| | | The name of 0 is reserved for system purposes, being used during sensor initialization. |
| Num Packet | 2 | The current packet number, which fulfills several functions:<br>1. Protection from repeats — each device (the central node/controller, a sensor, etc.) makes its own count. The packet number allows to send a repeat packet, e.g. in case it wasn't properly received due to bad signal, while informing the receiving side that it is a repeat packet rather than a new one.<br>2. Encryption — the packet number is used in encryption, as it is one of the fields, which is always changed in two consequent packets.<br>3. Filtering by packet number — the number is used to differentiate between working and faulty sensor and also allows to avoid attacks based on recording the sequence and sending it again instead of a real message. |
| Command | 1 | The command itself, around which the packet is formed |
| Data | 0-32 | Command data (their exact quantity and format depend on the command itself) |
| CRC | 1 | The packet checksum, which guarantees that the receiving side receives the packet in complete and valid condition. Data may become invalid or incomplete during packet encryption/decryption and/or because only a part of a packet was received by the modem (due to packet partition, losses, buffer rewriting, hardware reading errors, etc.). |
| Preamble | 8-10 | It is added or removed by a transceiver to synchronize data transfer speed and to detect a data packet being broadcast against the noise. Receivers always send packets with an 8-byte preamble. Sensors with multi-frequency embodiments use 10 bytes, or 8 bytes too. |
| Sync Word | 2 | A sync word is a unique combination used to distinguish the packet beginning within an uninterrupted data flow in the radio channel. The sync word is added and removed automatically by the transceiver. |
| CRCTR | 2 | The transceiver's checksum, which is added, monitored and removed automatically by the transceiver on a hardware level. It enables the hardware to check whether the packet is correct and make a corresponding decision. |

According to the exemplary embodiment, time periods needed to transfer a packet are (various lengths, depending on the pre-set speed)

| Parameter | Time, ms |
|---|---|
| $T_{pack\ min}$ (24 bytes) | 10,0 |
| $T_{pack\ max}$ (80 bytes) | 33,3 |

Figure 27:
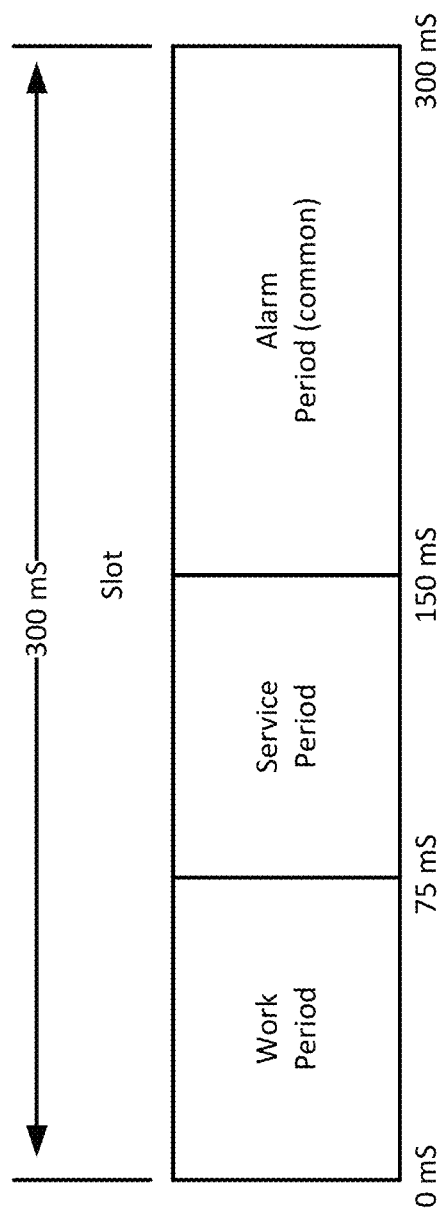
FIG. 27 illustrates a format of slot with service period in accordance with the exemplary embodiment.

A slot is a minimal quantum of time for data exchange in TDMA. A slot comprises three time periods, each devoted to a specific function. A slot has the format depicted in FIG. 27.

| Time periods | | Notes |
|---|---|---|
| Slot | 300 ms | Its length is pseudorandom within a small range in order to desynchronize the slot from the neighboring systems |
| Work period | 75-150 ms | It can also overtake the service period, if necessary. This period is assigned to a specific sensor for operation data exchange, such as status, synchronization, settings uploading, etc. |
| Service period, ms | 0-75 ms | It is used to send commands to executive devices, such as alarms, controlled sockets, etc. |
| Alarm period | 150 ± 10 ms | The alarm period is shared by all sensors, with any sensor being able to sound alarm without waiting for its own slot. If there are simultaneous alarms from different sensors, the system used a dedicated algorithm to differentiate between them (see below). |

The slot length is assigned individually for each system from a range of 290-310 ms, in a pseudorandom way. For details on why and how it is done, see below.

Figure 3:
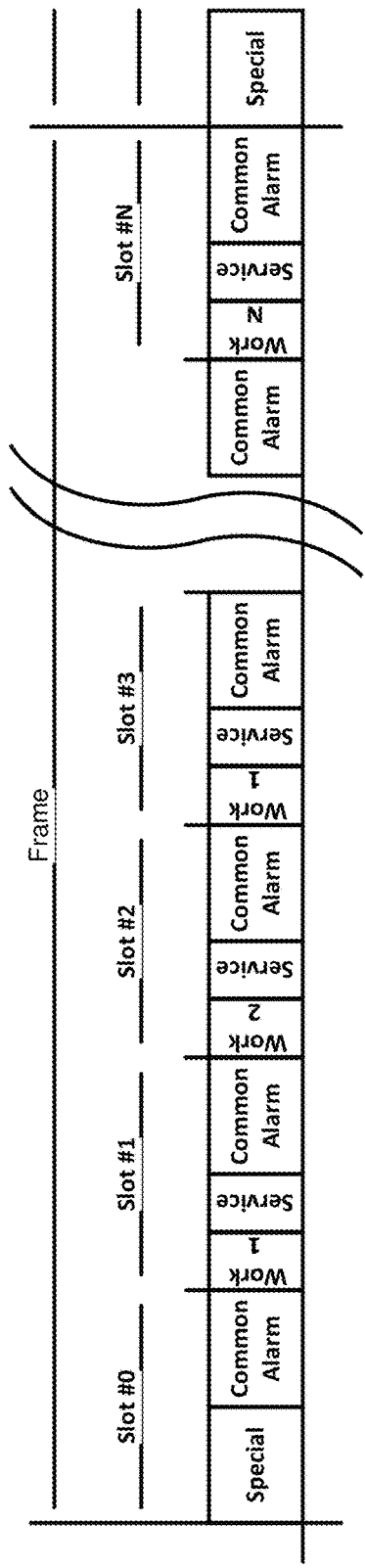
FIG. 3 illustrates a format of frame and slots, in accordance with the exemplary embodiment.

A frame format (network synchronization) has the format depicted in FIG. 3.

The frame period is a factor of 12 sec, between 12 sec-5 min:

| Period | Time | Notes |
|---|---|---|
| Frame, sec | 12, 24, 36 . . . 300 | 1 × 12-25 × 12 |

The zero slot (work period) is reserved for service purposes, while address number 0 is also reserved for registration. Thus, there is never a sensor No. 0 occupying the zero slot in a system.

Correspondingly, the system capacity is as follows:

| | Frame period | | | | |
|---|---|---|---|---|---|
| | 12 | 24 | 36 | 1 min | 5 min |
| Number of sensors | 39 | 79 | 119 | 199 | 999 |

For hardware and practical reasons, the upper limit is 100 sensors in a system. A potential logical limit for the protocol is 255 sensors.

Figure 4:
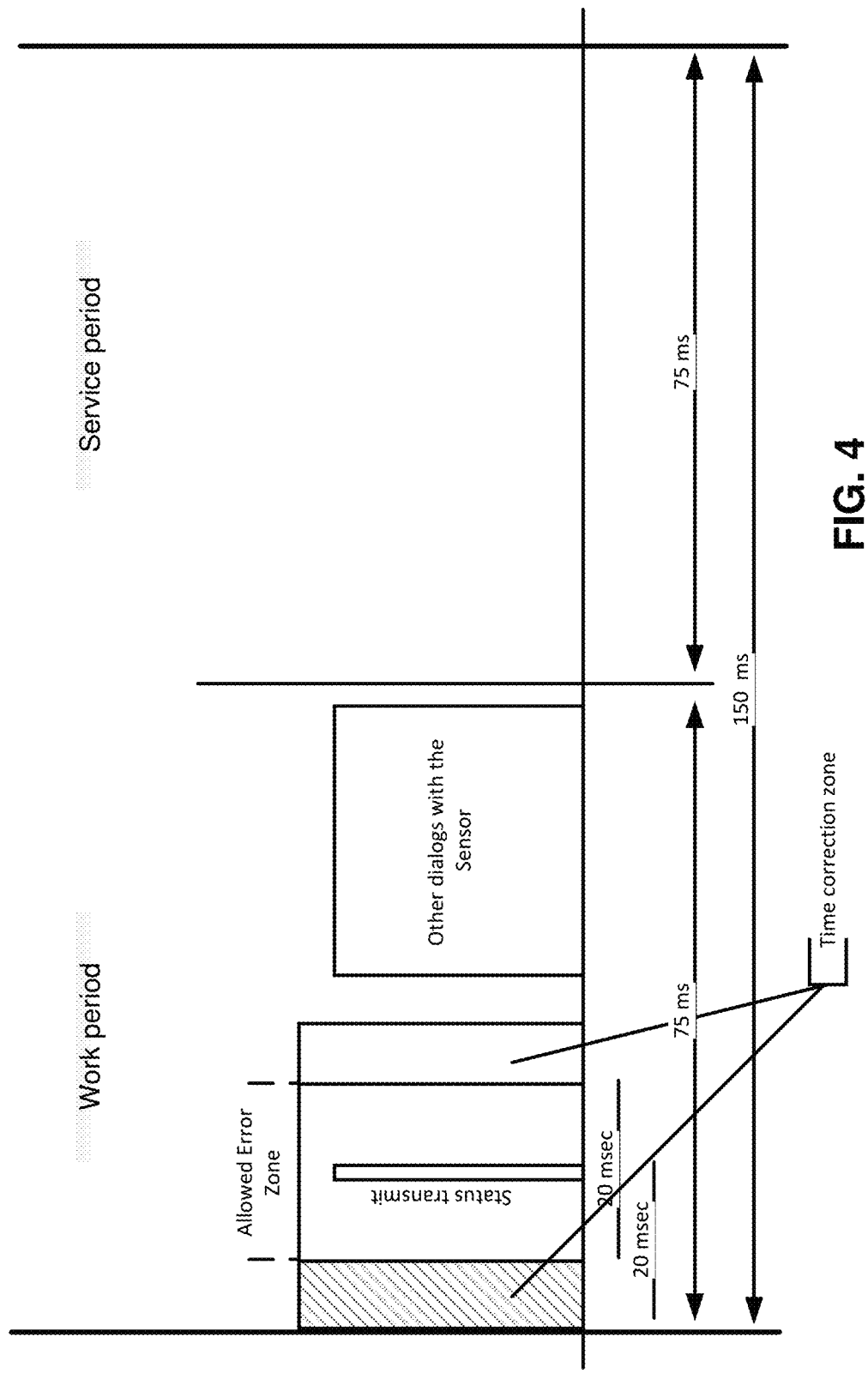
FIG. 4 illustrates an empty service period, in accordance with the exemplary embodiment.

An empty service period is shown in FIG. 4.

Figure 5:
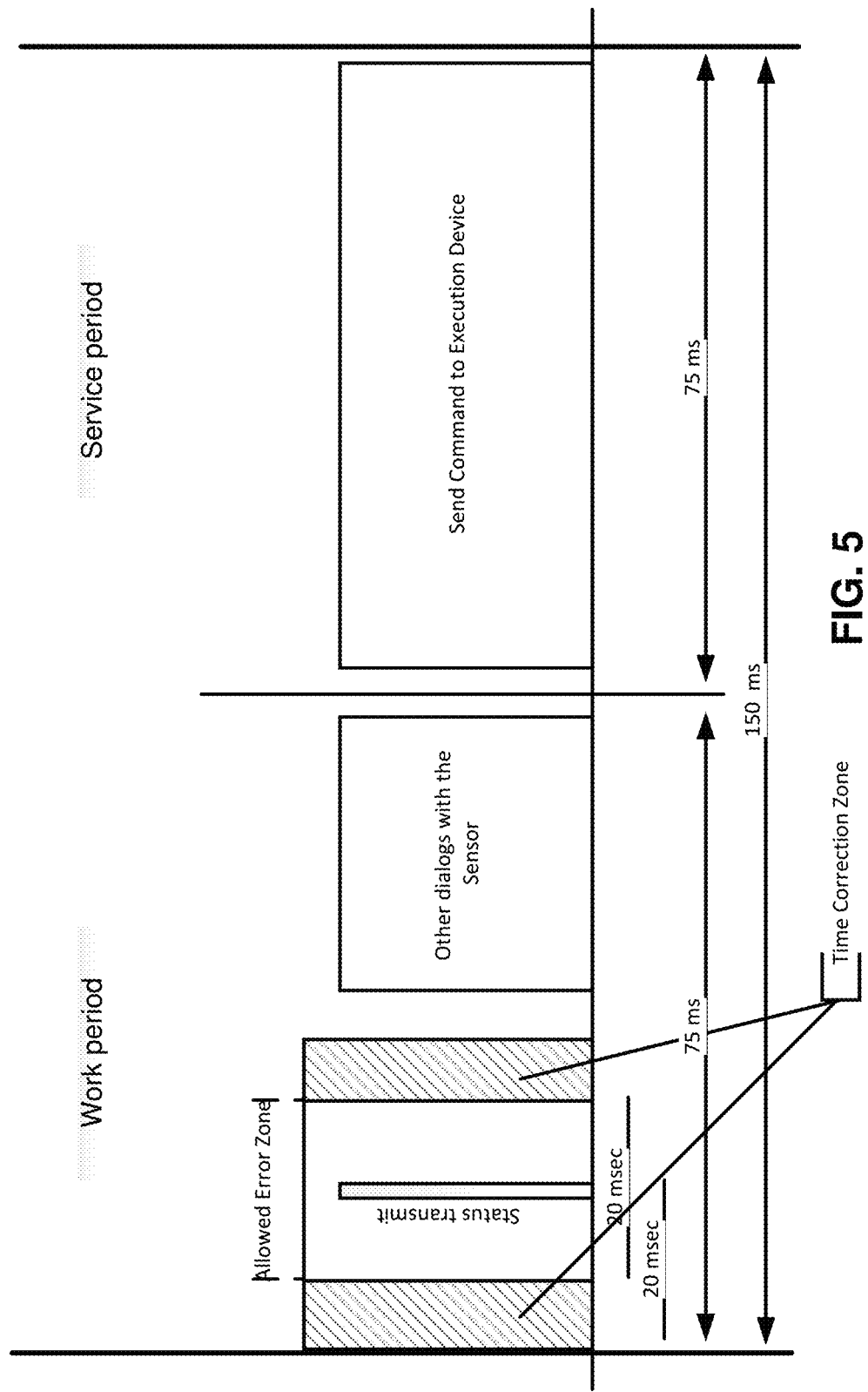
FIG. 5 illustrates using the service period as intended, in accordance with the exemplary embodiment.

Using the service period as intended is shown in FIG. 5.

Figure 6:
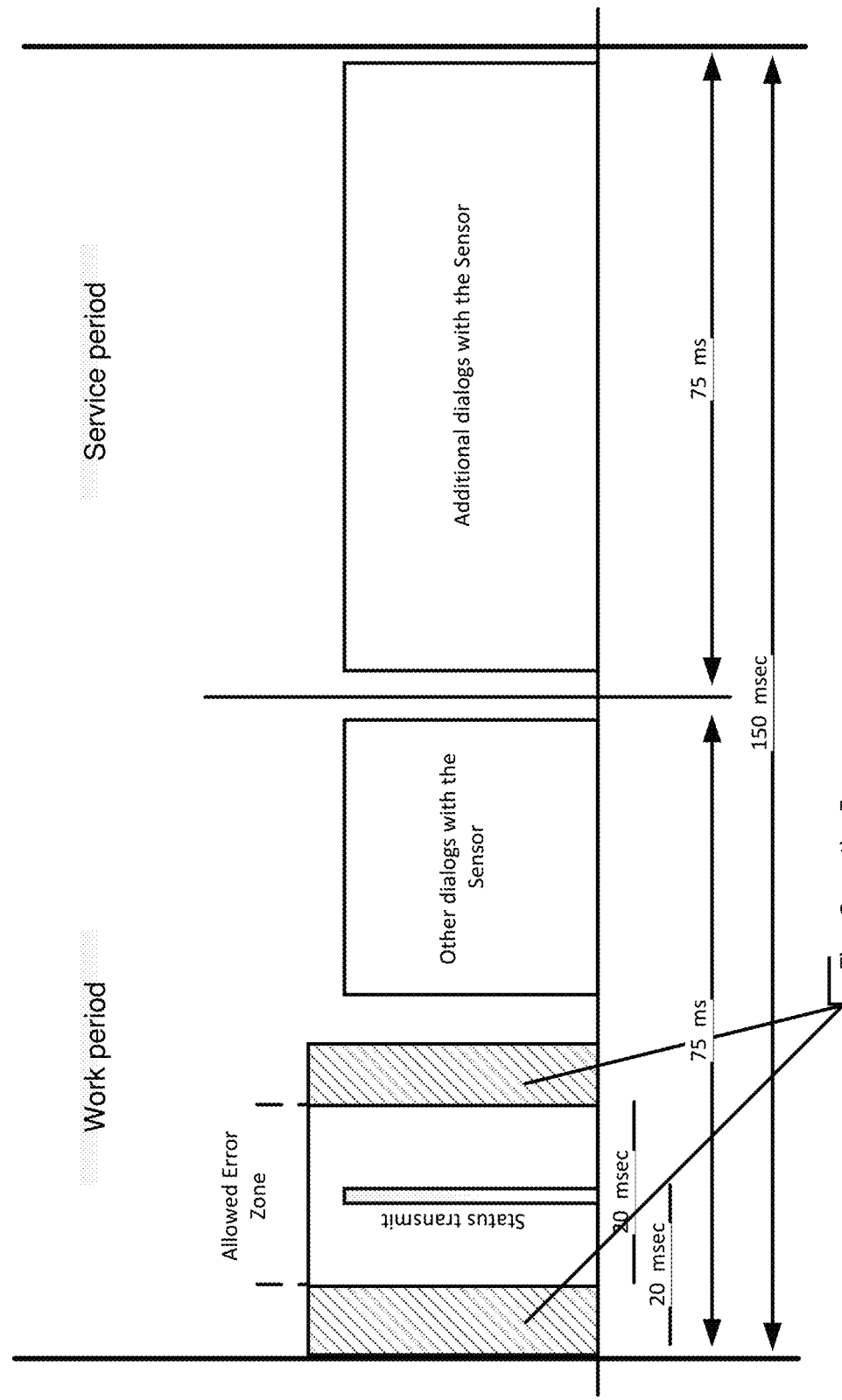
FIG. 6 illustrates how a work period can be extended at the expense of a service period, in accordance with the exemplary embodiment.

A work period can be extended at the expense of a service one as shown in FIG. 6.

Figure 7:
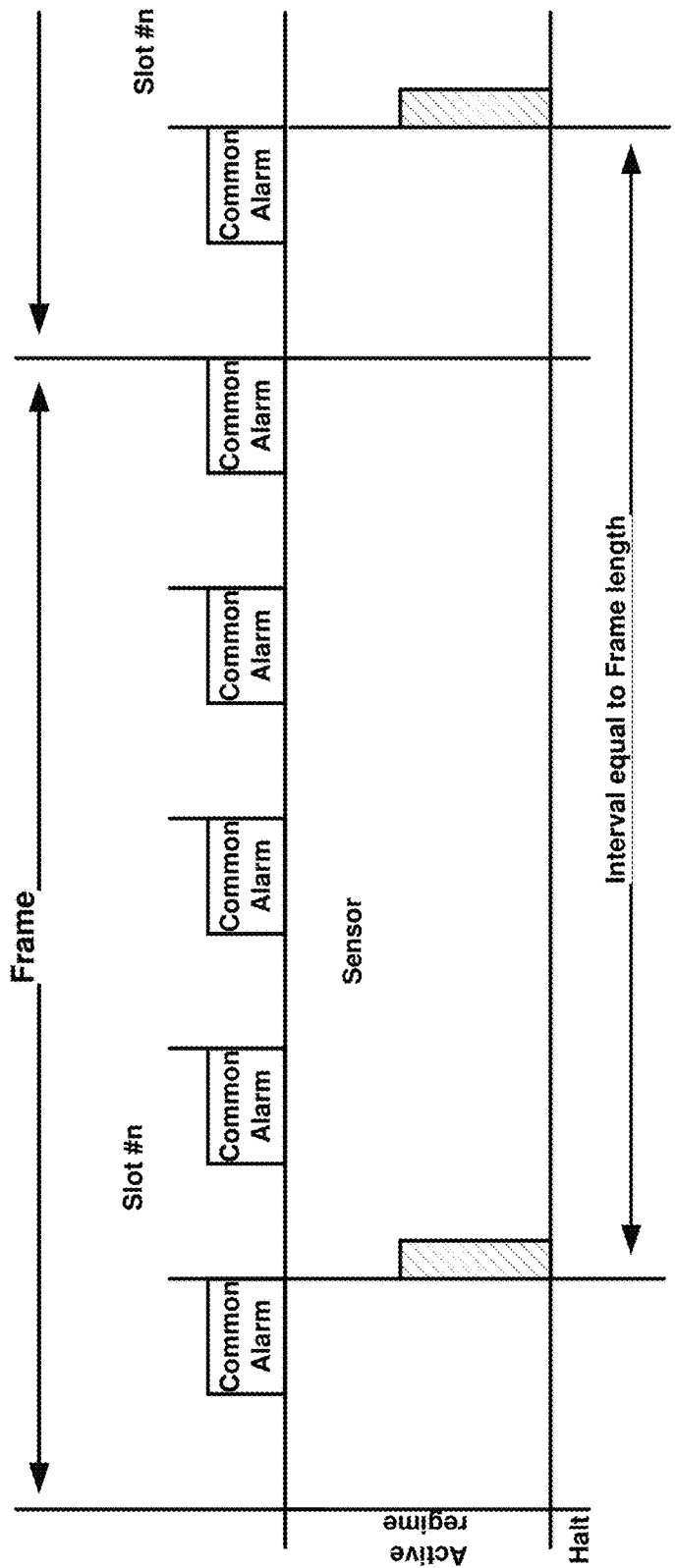
FIG. 7 illustrates a sensor behavior (going from sleep mode to active mode), in accordance with the exemplary embodiment.

Sensor behavior (going from sleep mode to active mode) is shown in FIG. 7. According to the exemplary embodiment, sensors always stay in a sleep mode, waking up only when their slots come. A wake-up time is controlled by a real-time clock (RTC) using a wake up timer, which counts down identical time periods and wakes up the sensors or controller(s) upon expiration.

System desynchronization is implemented as follows. When there are several systems working in proximity to each other, one of the main requirements—a high synchronization stability—may well turn out to be a hindrance. Assume there are two systems working alongside one another. They are not mutually synchronized, and their clocks always have some difference, so they are constantly drifting apart little by little.

Figure 26A:
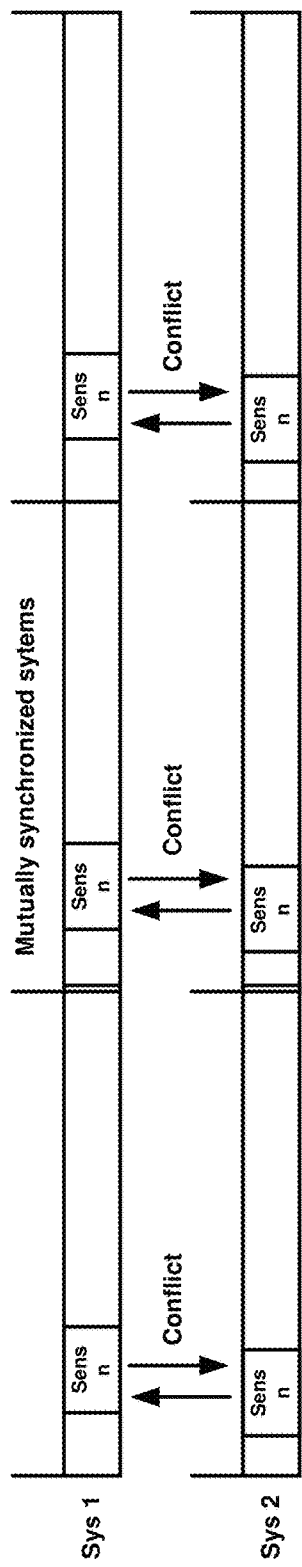
FIGS. 26A, 26B illustrate a de-synchronization mechanism of the two systems

Eventually, it happens that a sensor belonging to the first system broadcasts at the same time as a sensor belonging to the second system. The more stable both systems are, the less is the difference between them, so it takes much more time for them to drift apart naturally, while the sensors are filling the airwaves with noise and jamming each other. In practice, if the systems are clocked with a quartz clock having the stability of 10 ppm, the sensors can be jamming each other for 1.5-2 hours. Meanwhile the systems are jittering, generating the "Sensor lost" error message shown in FIG. 26A.

In order to keep high synchronization stability and avoid this problem, some controlled system desynchronization should be maintained. If the slot length is changed by 1 ms only, it would be enough to pull the systems apart and avoid collisions completely. 1 ms deviation per slot makes up for an overlay, which is a multiple of the number of slots in the frame (i.e., 12 ms or more), which allows the colliding sensors to resume normal operation in the next frame.

The slot length may deviate within 10 ms, which does not affect alarms, but allows for desynchronization among a number of systems.

SlotLenght=290+rand(0 . . . 20)

rand=$f(ID_{Central})$

The overlay is defined in a pseudorandom way based on the mathematical combination of ID bytes of the central node. Thus, the overlay can always be defined through ID_Central, but still is extremely unlikely to be repeated according the law of equal probability distribution.

Figure 26B:
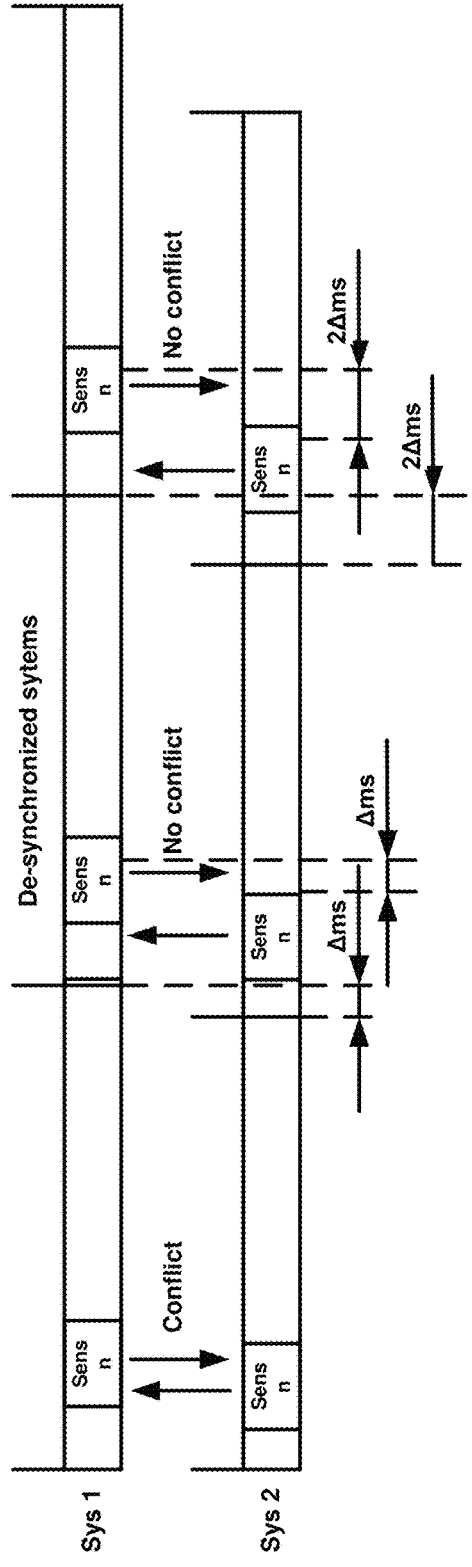

This method allows for 5-6 systems (based on physical slot capacity for several request-reply dialogues) to operate freely in close proximity to one another without collision as shown in FIG. 26B.

Figure 8A:
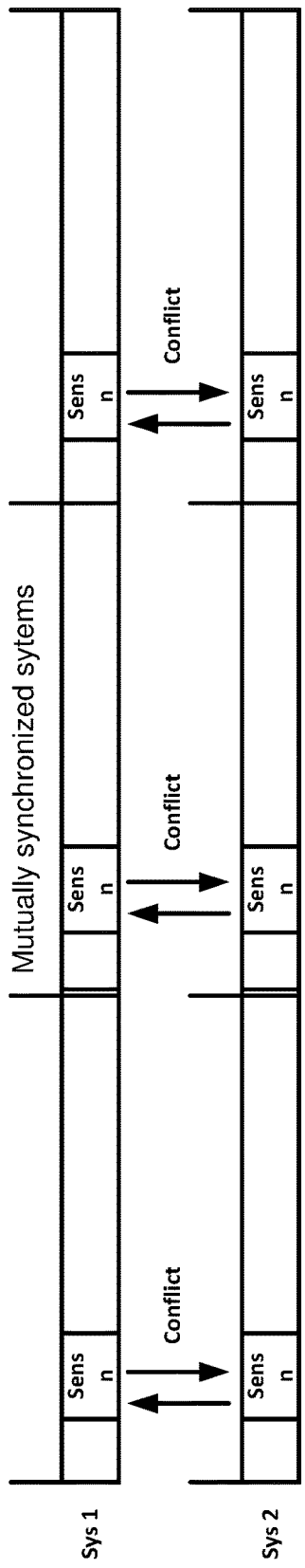
FIG. 8A illustrates two systems that are in sync.
Figure 8B:
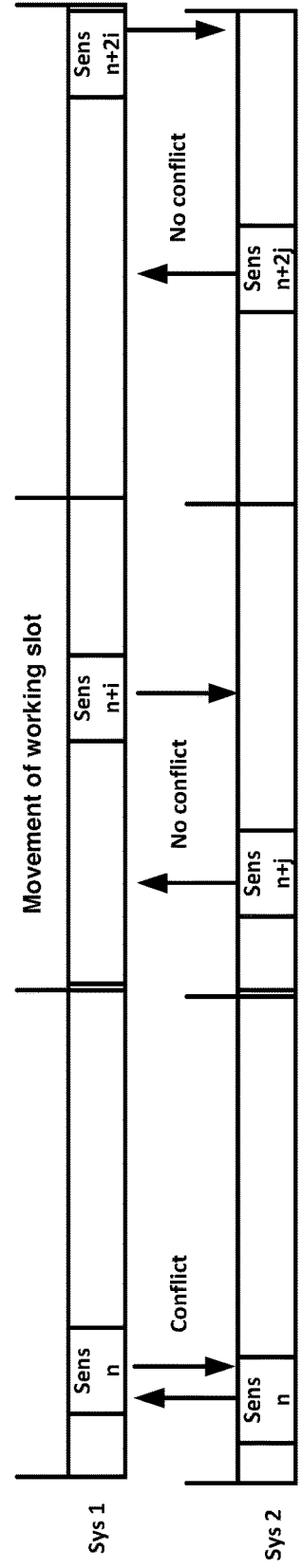
FIG. 8B illustrates how a working slot of a sensor is changed in each new frame in order to separate sensors for de-synchronize two system.

According to the exemplary embodiment, if the previous method is exhausted, but the systems are still experiencing collisions, there is another desynchronization mechanism, which involves working channel interleaving between frames. Again, let there be two systems, which are in sync as shown in FIG. 8A. Note that both of them have sensors with identical working slots. In order to pull them apart, the working slot of a sensor is changed in each new frame according to an example depicted in FIG. 8B.

To prevent this process from forming an endless loop, a super-frame notion is introduced. A super-frame comprises 5 ordinary frames. After all 5 frames have been clocked through, the slots are returned to their initial positions and then changed again through the next 5 frames within a new super-frame. The system cyclically shifts the working slot forward (increasing its number) by a variable, which is set by the central node from a range between 2-20 in a pseudorandom way, always skipping the 0 slot.

Figure 9:
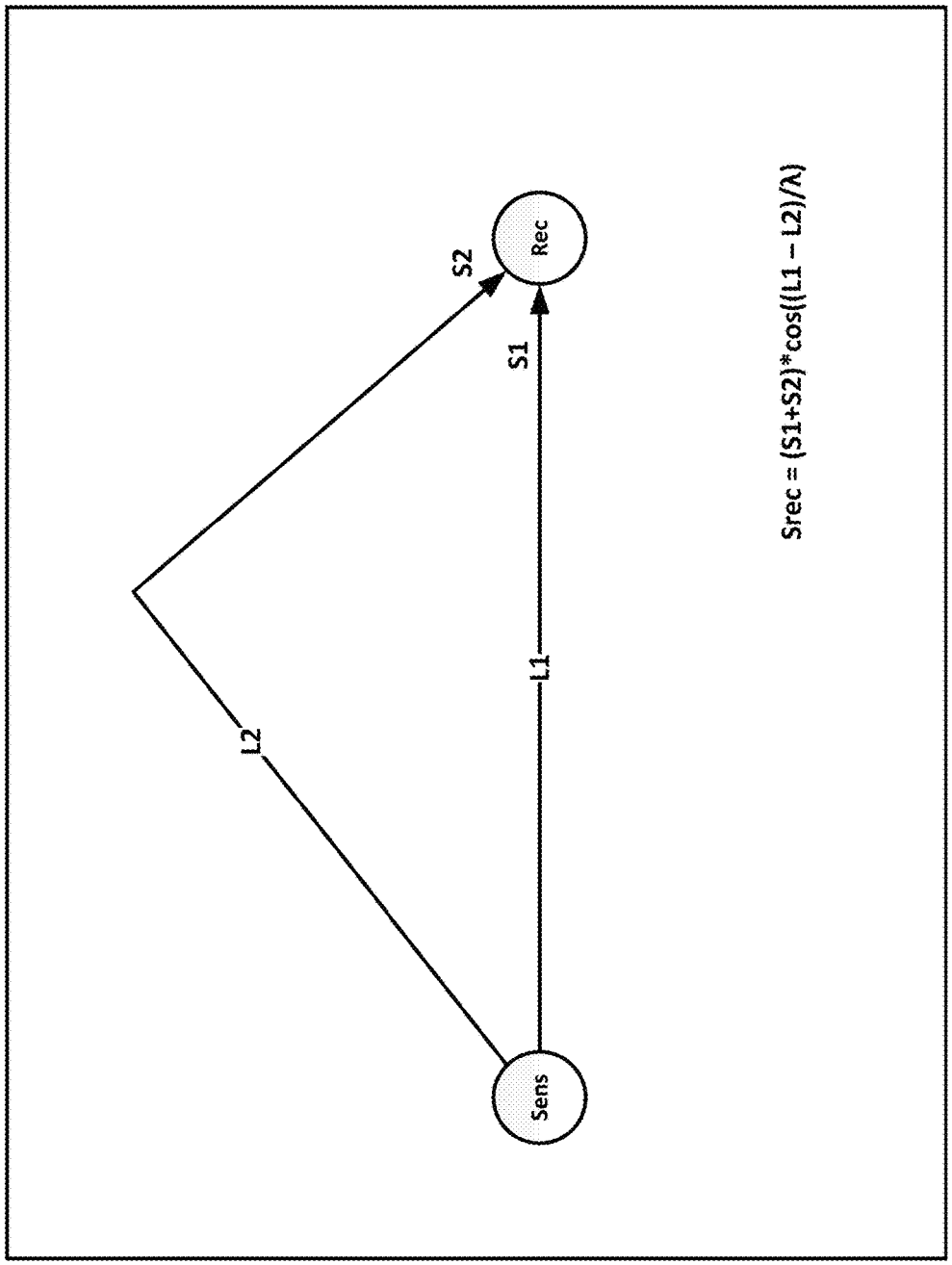
FIG. 9 illustrates reception errors or missing the signal completely results from multipath reception.

This method is inferior to the one above, since it is effective only if there are free slots in the system, and they abound. If both systems lack free slots, even after the shifting, some sensors will still experience collisions with other sensors from a neighboring system. Signal fadeouts are among the most undesirable effects in data broadcasting. On their way from the sensor to the receiver, radio signals may reflect from various obstacles (e.g., walls or interior objects). Multiple reflections may result in more than one copy of the signal reaching the receiver at once. If one of the copies happens to be in phase opposing to the original signal (i.e., it is late by half the wave period—1.5, 2.5, etc.), then, after two copies are added, the signal will fade out. As a result, the signal energy will be below the receiver's response threshold, which leads to reception errors or missing the signal altogether as shown in FIG. 9.

Connection may be lost even in the shortest range (e.g., inside a room), even with a high power, as overlaying signals may neutralize each other completely.

Figure 10:
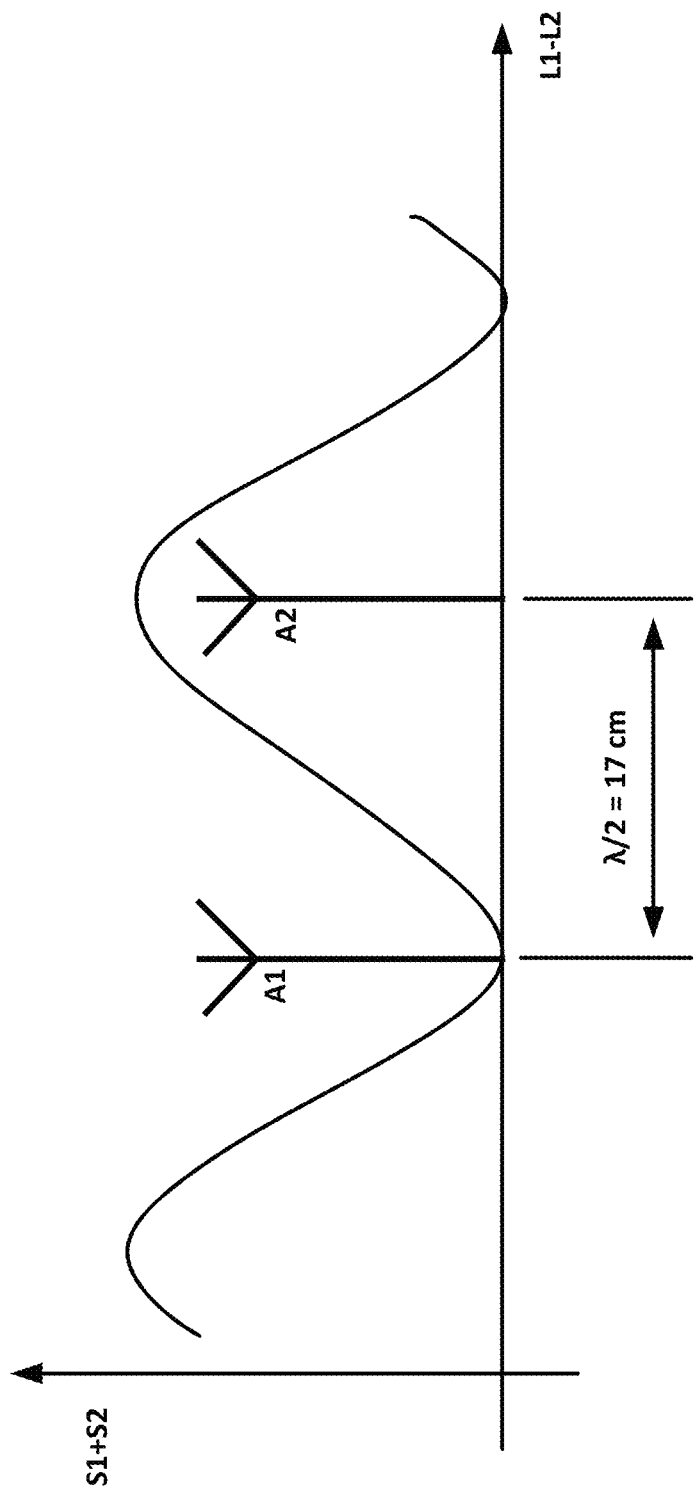
FIG. 10 illustrates a possible distribution of signal amplitudes in the simplest case (two signals), based on the difference in signal tracks.
Figure 11:
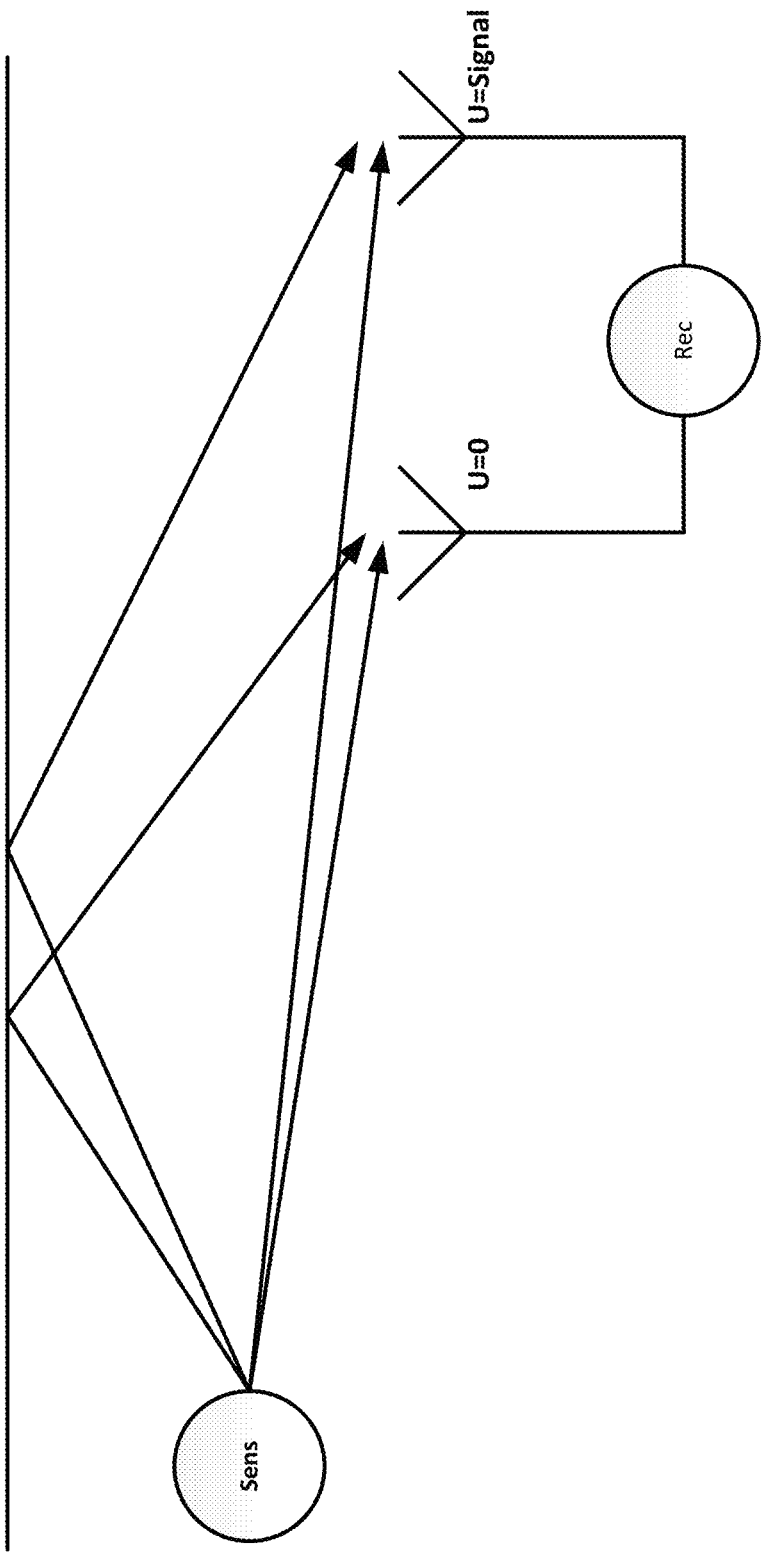
FIG. 11 illustrates that, if one antenna is in an interference pocket, the other antenna will be receiving signals well, in accordance with the exemplary embodiment.

FIG. 10 illustrates a possible distribution of signal amplitudes in the simplest case (two signals), based on the difference in signal tracks. In practice, however, there are many more rays, and the diagram looks much more convoluted, but the essence is the same. In order to avoid this problem, a central node/controller has two antennas situated half-wavelength (for example, 8.5 cm) away from each other. Also, in order to increase the probability of reception, both antennas have different polarizations in case the signal reverses its polarity after multiple reflections, or sensors have been placed haphazardly, disregarding their polarization. Thus, if one antenna is in an interference pocket, the other will be receiving signals well as shown in FIG. 11.

Figure 12:
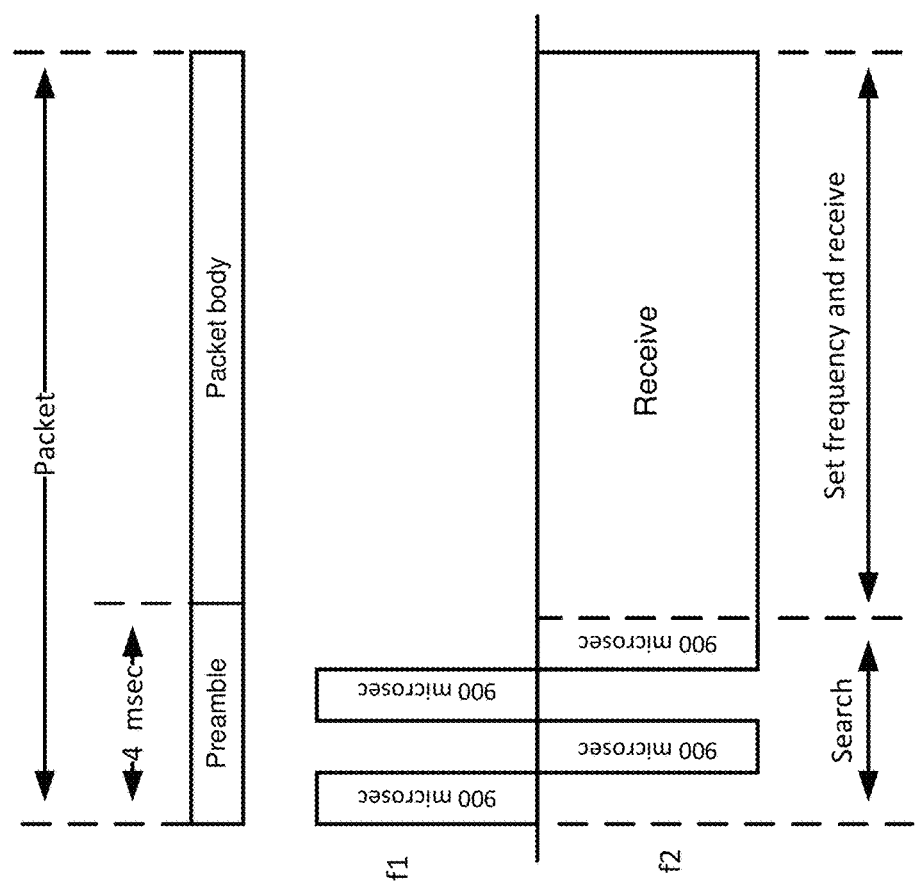
FIG. 12 illustrates that a system monitors two frequencies at once, choosing the one which has no noise in it, in accordance with the exemplary embodiment.

The working frequency may be occupied by a noise generator (e.g., other systems, deliberate jamming, etc.). To ensure that the packets are delivered, the packets are repeated on an additional frequency. Thus, even if one of the frequencies is jammed completely, the system will still be able to operate using an additional one. In order to function in multi-frequency mode, sensors have their preamble lengthened to 10 bytes, which is broadcast for 4 ms. Over this period of time, the microcontroller is switching through frequencies several times (once per 900 μsec), finding one frequency with the most powerful and high quality signal, which is then fixed until the packet is received. That is, the system monitors two frequencies at once, choosing the one which has no noise in it. For example, the following frequencies are used (see FIG. 12):

f1=868.0 MHz
f2=868.5 MHz

Figure 28:
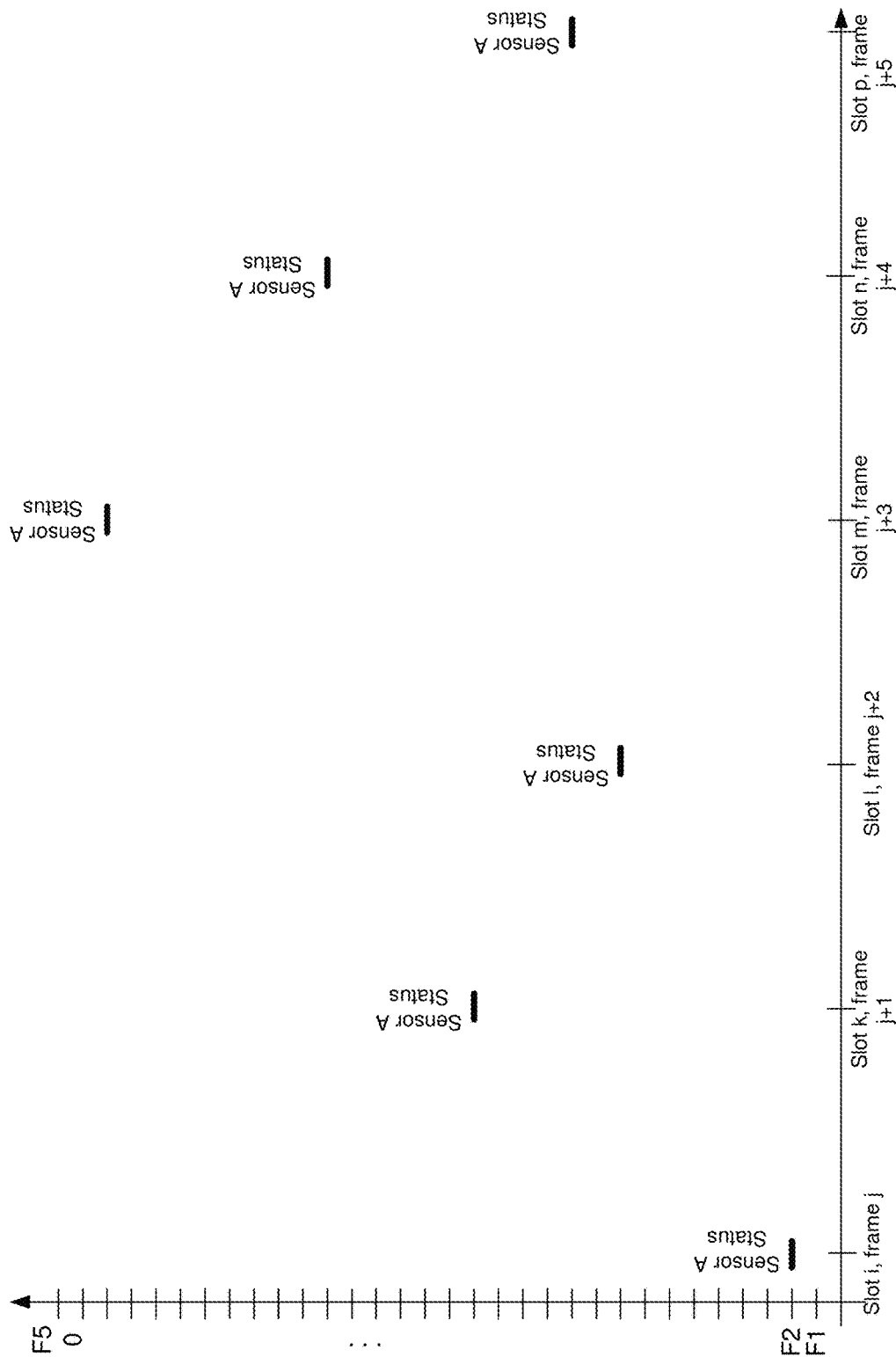
FIG. 28 illustrates frequency hopping.

FIG. 28 illustrates frequency hopping. This is an alternative to the previous method, and it is more noise-resistant. This method should be used in places where the system is allowed to work in broadband (10+ MHz); otherwise, if the system is to work in a narrow band (600 kHz), the previous method is preferable.

While frequency hopping, each new packet from sensors uses a new randomly selected frequency. Frequencies are searched through using a pseudorandom algorithm, which is known to both the sensor and the receiver. This process would seem completely random to an outside observer, and all system frequencies have an equal chance of being used (it stays true for each individual sensor, as well as for a large number of sensors, i.e., more than ten).

A frequency is selected using the channel number and the current frame number. Frames are numbered in continuous fashion, so that two consecutive frames will have different numbers. By combining the slot number and the frame number, sensors and receivers unambiguously pinpoint the needed element from the frequency table, containing the current frequency.

The frequency table is filled in using a pseudorandom rule with even distribution, and it contains 50 frequencies with the step of 0.25 kHz (both the number and the step can be adjusted for each system depending on its requirements).

The receiver, like described above, continues to listen to two frequencies at once, but in this case one frequency will be considered base, and another will be taken from the table according to the current slot and frame. The base frequency is used exclusively to synchronize the sensors and for registration. Only table frequencies are used for data exchange, and they are being constantly hopped through.

Below is an example of a pseudorandom frequency table with channel numbers:

```
const uint8_t HopChanTable[MAX_COL_CHAN] =
{
  49, 42, 24, 7, 5, 34, 27, 6, 39, 20,
  37, 14, 26, 33, 4, 13, 16, 23, 2, 8,
  48, 40, 29, 38, 35, 30, 15, 25, 41, 18,
  21, 45, 31, 28, 11, 50, 43, 1, 47, 44,
  46, 19, 22, 3, 10, 12, 17, 32, 36, 9
};
```

Frequency is counted starting with the base channel by multiplying the channel number by the step between channels, adding the base channel frequency. The result is the actual frequency of the channel in question.

Channel 0 corresponds to the base frequency and is not used in the table.

The receiver has the RFM66 radio unit, which is more effective (and less power consuming) and is able to receive signals within 100 kHz bandwidth (due to the AFC circuit). Sensors have narrow-band RFM69 radio units, with a bandwidth of about 5 kHz.

Figure 13:
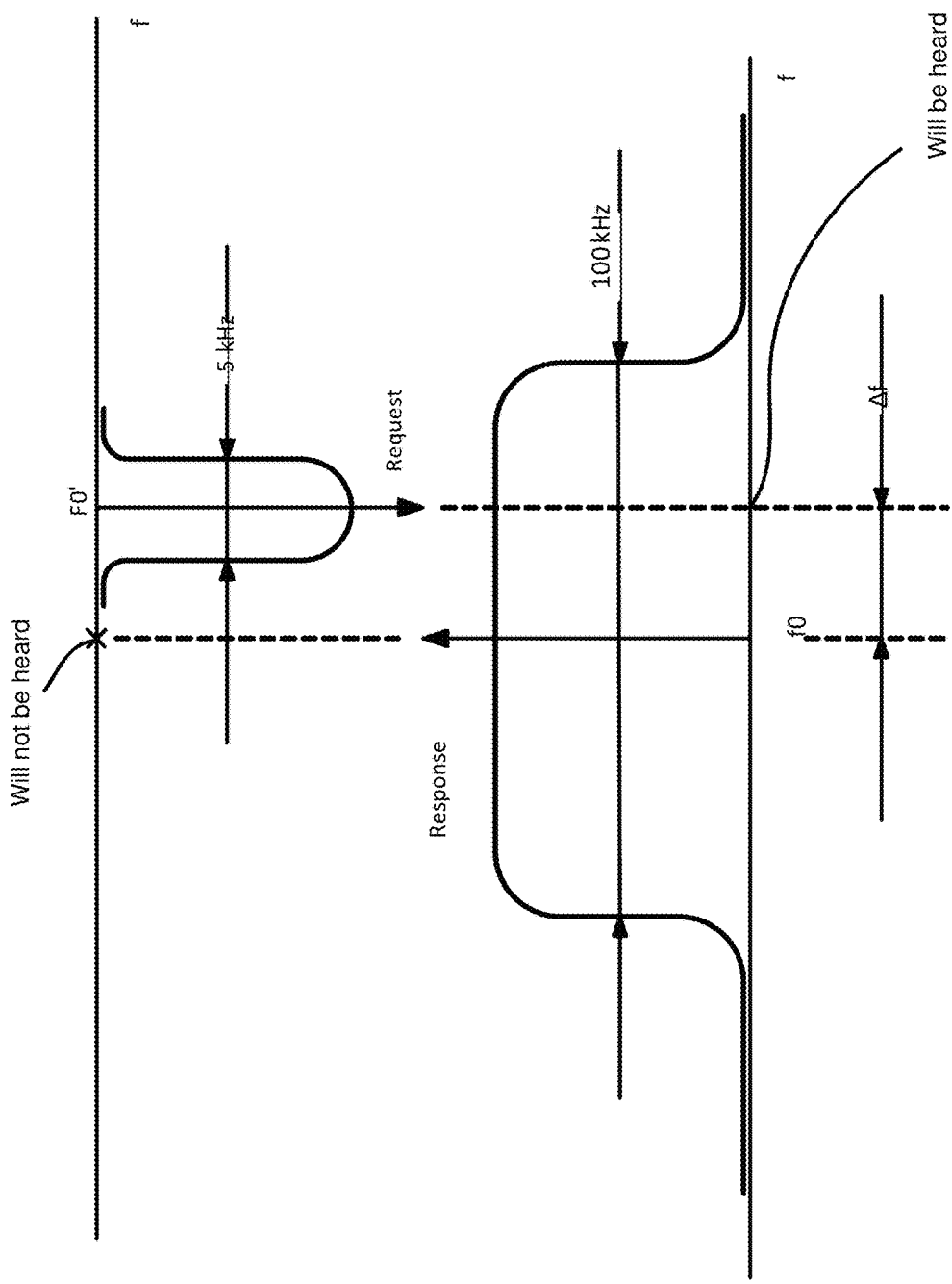
FIG. 13 illustrates a scenario where a the signal is not received properly because of a large difference between carrier frequencies of the sender and receiver.
Figure 14:
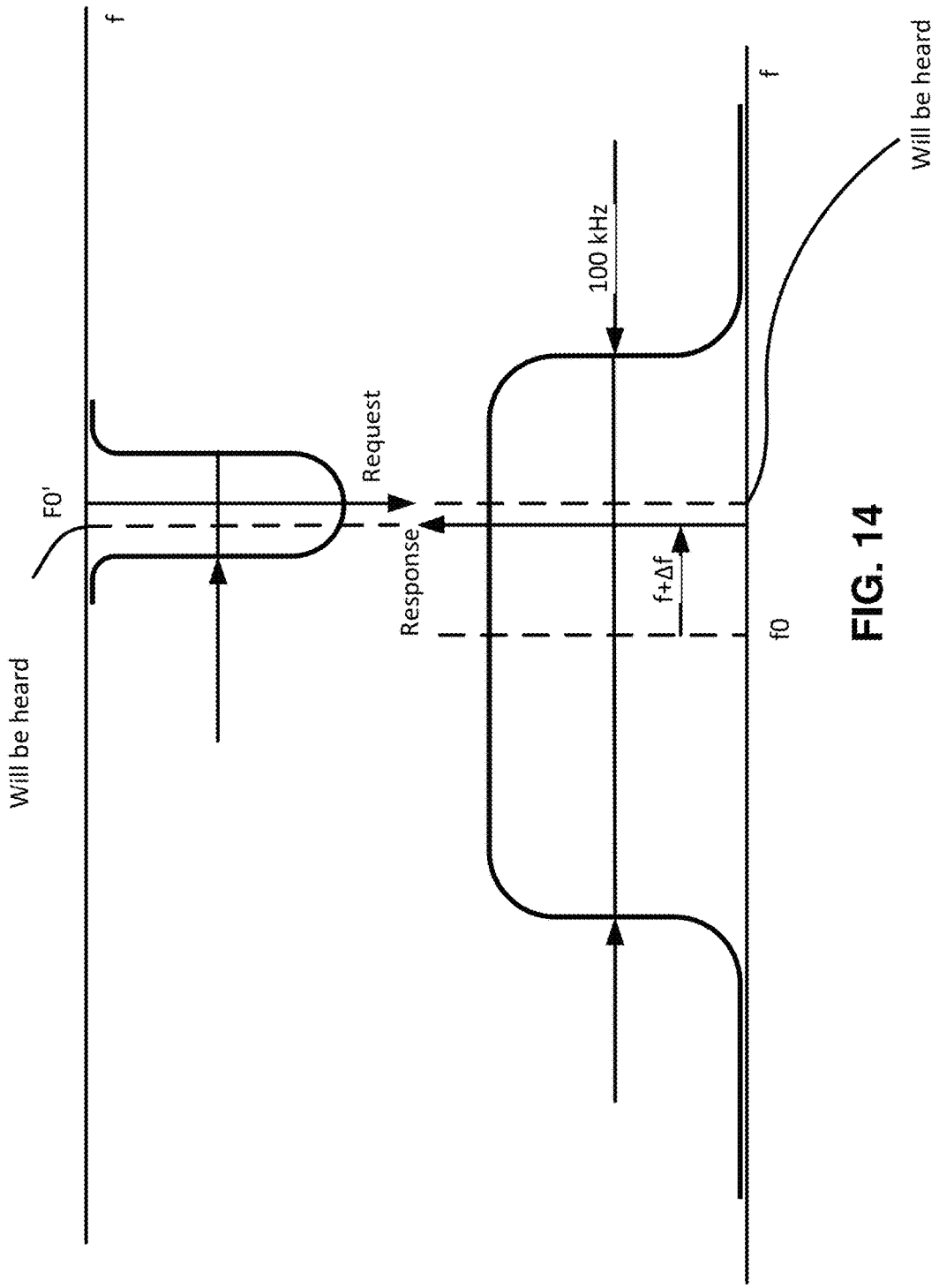
FIG. 14 illustrates that a receiver responds to the sensor at the same frequency that was used to send the request due to frequency adjustments.

Under normal conditions, manufacturers ensure that $f_0=f_0'$ (see FIG. 13). In order to do that, manufacturers monitor all purchased parts and do the checks for each device on the output. Still, external factors (time, temperature, etc.) may introduce discrepancies of up to 60 kHz. That means that the receiver will have no trouble receiving the signals from sensors, but sensors will not be able to receive replies, since they are outside the sensor bandwidth. To avoid this, the receiver computes the deviation of the sensor's request from the expected carrier frequency ($\Delta f$), using this deviation to set the reply carrier frequency. That is, the receiver responds to the sensor at the same frequency that was used to send the request as shown in FIG. 14.

If frequencies are switched through too quickly, the deviation of the sensor's frequency may be computed incorrectly. Thus, in order to minimize the probability of error, the receiver uses an average deviation value after, for example, 20 measurements.

According to the exemplary embodiment, packets can be differentiated by directions, but also by headings and repetition times. The packet heading contains the addresses of both the sender and the receiver. Based on the device address, packets can be either broadcast or address ones.

| Packet type | Direction | Central Node No. | Sensor No. | Repetition qty (possible) |
|---|---|---|---|---|
| Broadcast | From the central | XXXX | 0 | 1+ |

| Packet type | Direction | Central Node No. | Sensor No. | Repetition qty (possible) |
|---|---|---|---|---|
| Address | Both directions | XXXX | YYYY | 1, 2, or more |
| Registration | Both directions | 0 | 0 | 1, 2, or more |

A registration packet is a specific packet type used to assign new sensors to a new central node. Addresses are reset to 0 (only for the exchange), and the authentication check is made by the operator conducting the registration process. To ensure that authentication goes smoothly, a shorter range (or lower power) may be used, processes may be started manually, and IDs of sensors being registered may be controlled visually. Otherwise, the operator may wait for known device IDs from the devices being registered.

Based on the repeat quantity (depends on delivery method and importance of the data), the packets can be:

| Packet type | Direction | Central Node No. | Sensor No. | Repetition no. |
|---|---|---|---|---|
| Notification | Both directions | XXXX | YYYY | 1 |
| Confirmation | Both directions | XXXX | YYYY | 1 |
| Request/ Transmission | Both directions | XXXX | YYYY | 2+ |

A specific case of notification with repeat number of 1 may not require a confirmation, or it can be a confirmation by itself.

Figure 15:
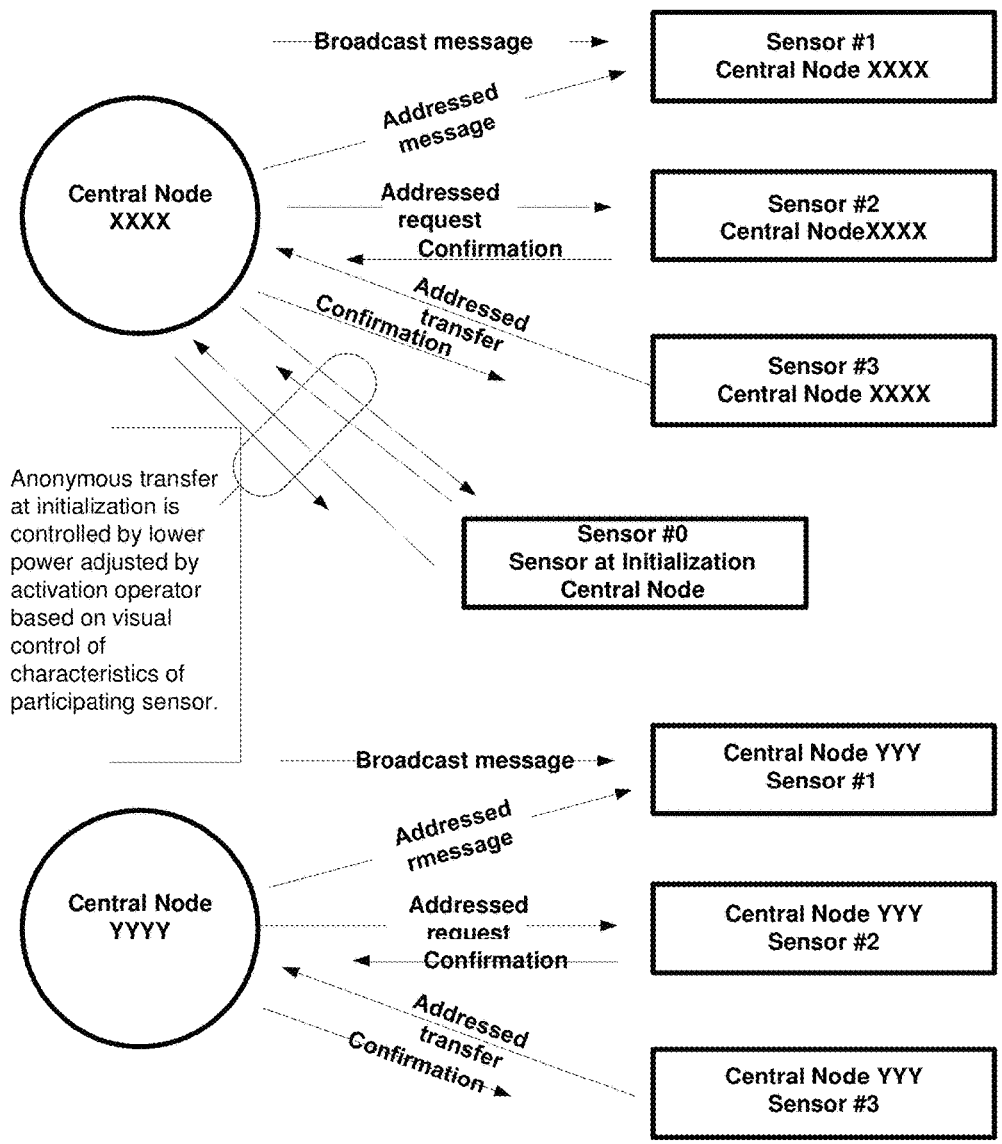
FIG. 15 illustrates a diagram of various packet types, in accordance with the exemplary embodiment.

A diagram of various packet types is depicted in FIG. 15.

According to the exemplary embodiment, the data is transmitted as follows. First the packet is generated: the header is created, a command is pasted, then all additional and necessary information is added. After that, the checksum is calculated for the entire body of the packet, and the checksum is added into it. Then, the packet data is encrypted, and the packet is ready to be broadcast. If, after the packet is sent, no reply is received within the specified time period, the packet is repeated again and again until the reply is received or the limit of repetitions is exhausted. If, after all attempts, there is still no reply, the device reports a transmission failure. The number of repetitions depends on the purpose and importance of the packet. Each repetition increases the probability of successful delivery (compared to the potential success in case of a single transmission), especially if there is much noise, or the range is very long. However, it also consumes more power and, thus, depletes the battery.

Below is a table of probabilities of successful delivery depending on the number of repetitions and based on the given probability of success of a single attempt. It is based on the probability of a successful one-way delivery. The two-way protocol means that the signal has to be delivered successfully in both directions, which is why the chances are much lower, dropping as the square of the chances for one-way delivery. There are two tables, reflecting difficult (probability of error of 50%) and extremely difficult (probability of error of 70%) radio exchange environments. Both tables show the correlation between the probability of error and the number of repetitions, for both one-way and two-way protocols.

| Initial probability of error -50% | | | Initial probability of error -70% | | |
|---|---|---|---|---|---|
| Repetition | Final probability of error | | Repetition | Final probability of error | |
| no. | One-way | Bidirectional | no. | One-way | Bidirectional |
| 1 | 70% | 91% | 1 | 50% | 75% |
| 2 | 49% | 81% | 2 | 25% | 56% |
| 3 | 34% | 72% | 3 | 13% | 42% |
| 4 | 24% | 65% | 4 | 6% | 32% |
| 5 | 17% | 59% | 5 | 3% | 24% |
| 6 | 12% | 53% | 6 | 1,6% | 18% |
| 7 | 8% | 47% | 7 | 0,8% | 13% |
| 8 | 6% | 43% | 8 | 0,4% | 10% |
| 9 | 4% | 38% | 9 | 0,2% | 7,5% |
| 10 | 3% | 35% | 10 | 0,1% | 5,6% |

Accordingly, the following can be considered:

Chances for a single delivery to be successful are linked to the initial single-packet probability.

In a two-way protocol, probabilities will always be lower than the initial single-packet probability, since the packets have to be delivered in both directions (request-confirmation);

If repeated three times, the packets in two-way delivery have almost the same chances as the initial single-packet probability;

Each additional repetition adds to the probability of successful delivery.

Figure 16:
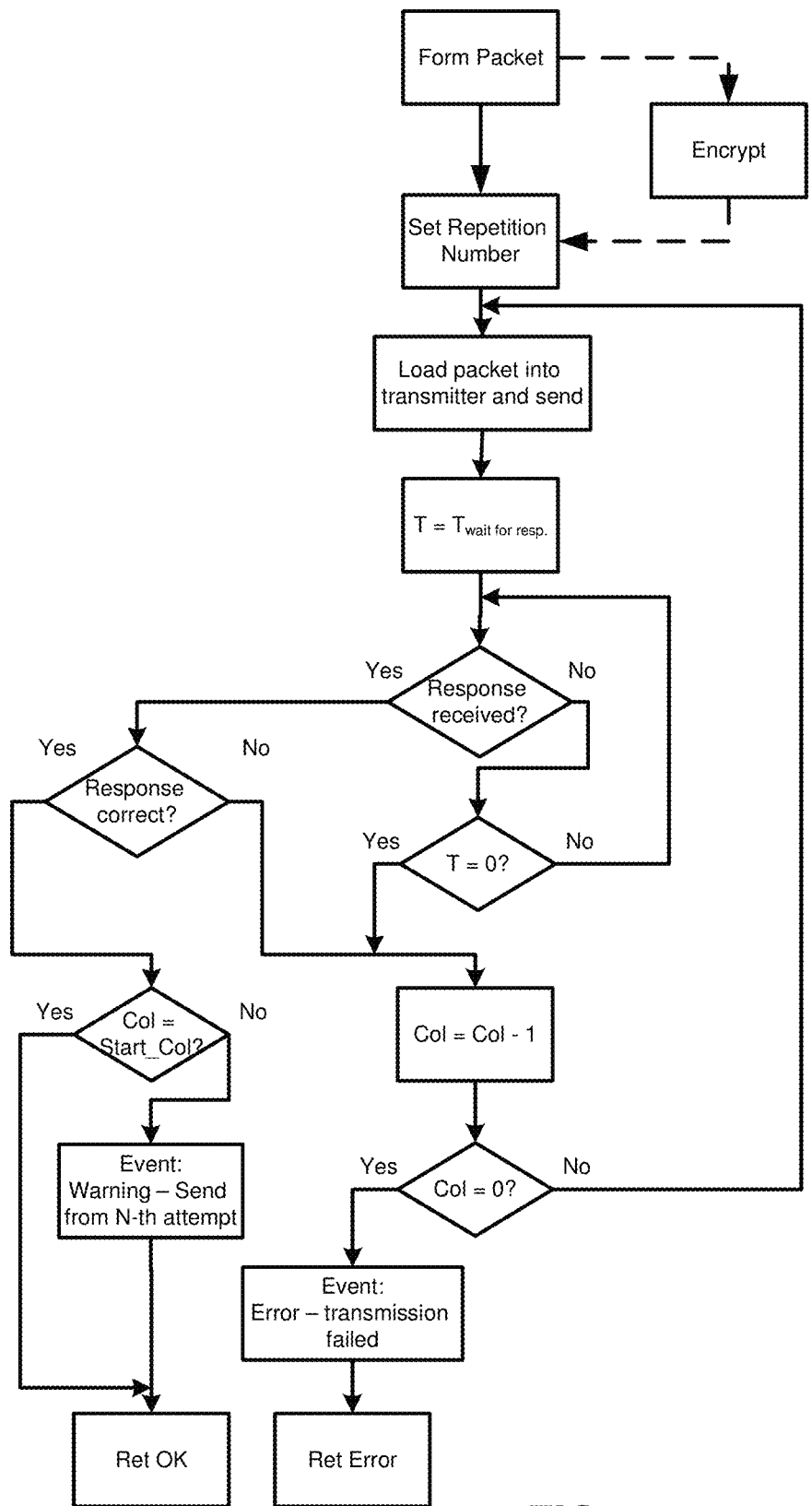
FIG. 16 illustrates a flowchart of a packet transfer algorithm, in accordance with the exemplary embodiment.

According to the exemplary embodiment, the data is sent based on an algorithm, which allows for setting the required number of repetitions for each packet. This algorithm operates at the transport level and allows to adjust the probability of delivery without tampering with the packet itself. In other words, the algorithm disregards the packet contents. The proposed packet transfer algorithm is depicted in a flow chart FIG. 16.

Repetition no. (Col):
1. Information messages—1;
2. Reception confirmation—1;
3. Data sending—3.

In this example, $T_{wait\ for\ reply}$=30 ms.

Figure 17:
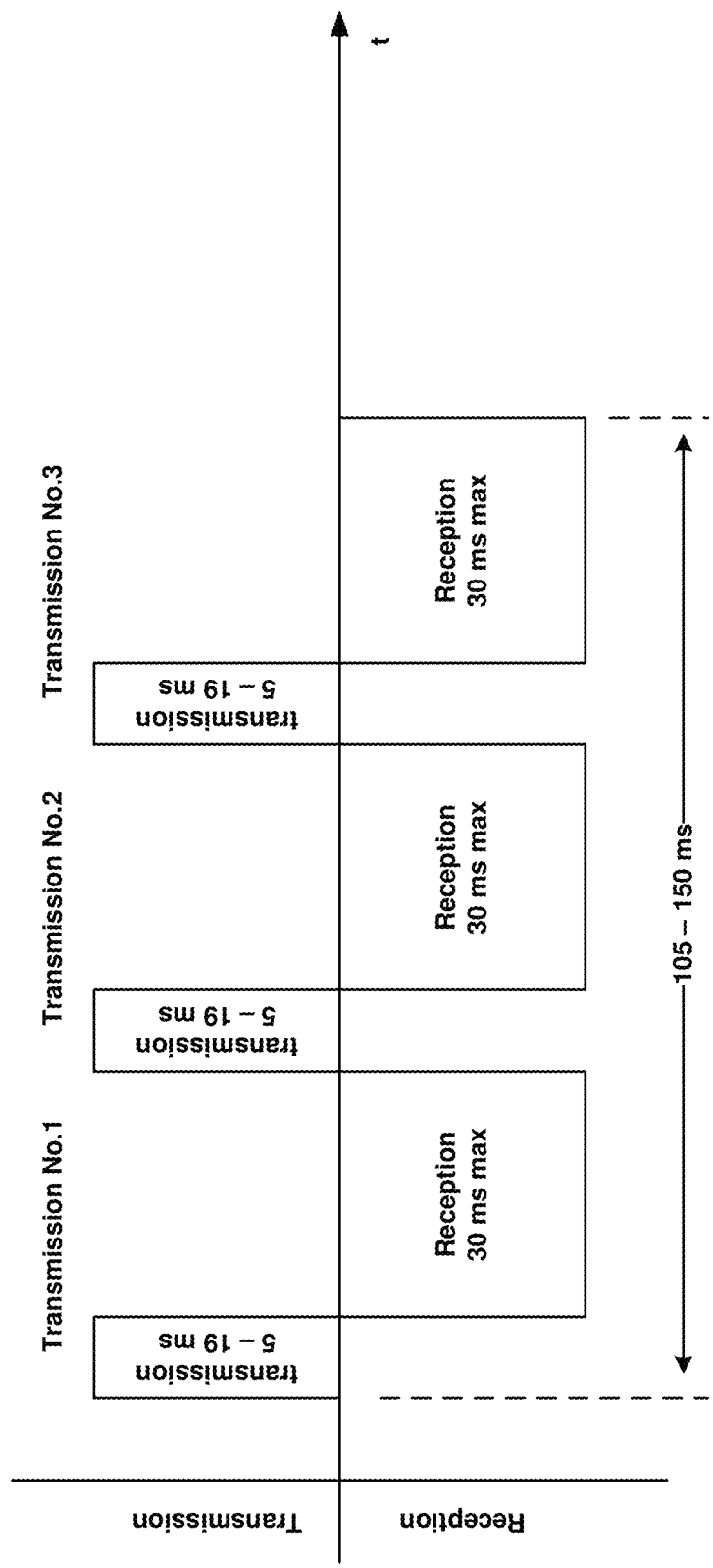
FIG. 17 illustrates a no reception reply (the worst-case scenario), in accordance with the exemplary embodiment.

The following outcomes are possible:

No reply (the worst-case scenario) is depicted in FIG. 17.

Figure 18:
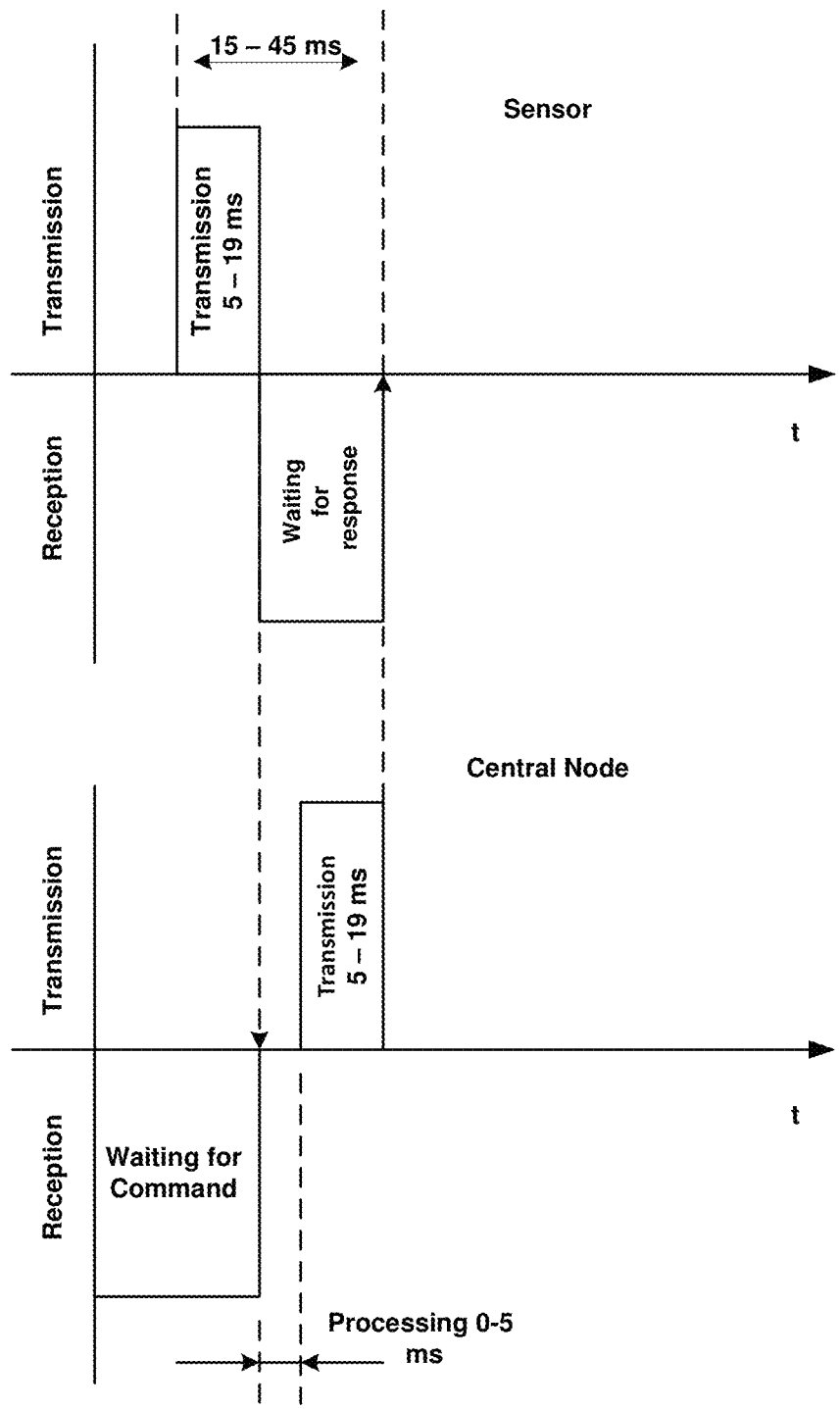
FIG. 18 illustrates a reception reply after the first attempt (the best-case scenario)

Reply after the first attempt (the best-case scenario) is depicted in FIG. 18.

Figure 19:
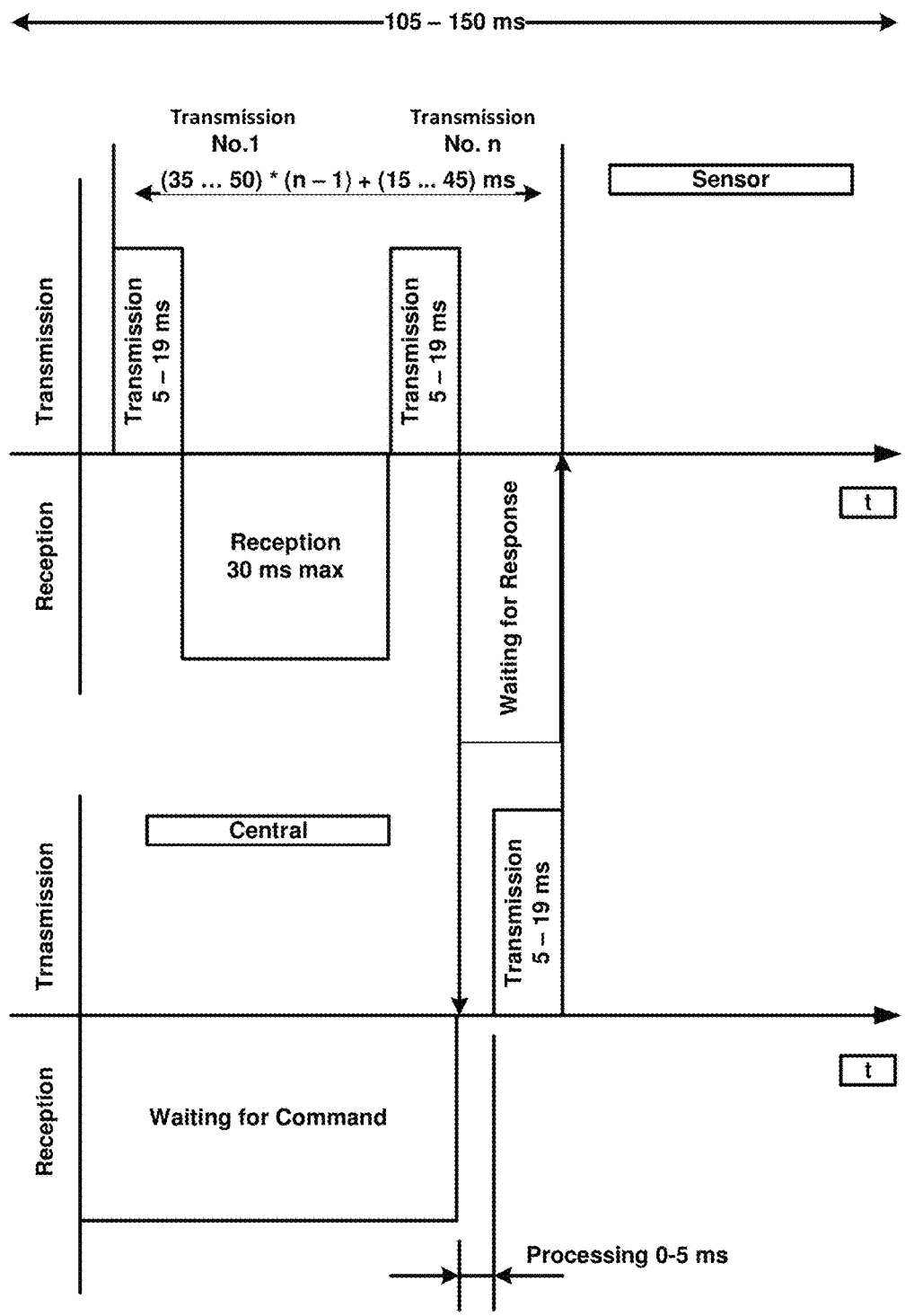
FIG. 19 illustrates a reception reply after n attempts scenario.

Reply after n attempts is depicted in FIG. 19.

Note the reply may contain confirmation, but also it may contain other commands, as receiving the packet and processing it are not the same thing. For instance, if status data were sent belatedly, the central may reply with "mc_Go-ToFindSynchro", which means that the central node has received the packet, but instead of processing it, the central node instructs the sensor to synchronize again.

According to the exemplary embodiment, filtering the packets by number (transport level) is implemented as follows. Each new packet is assigned a new number, even if the previous packet has not been delivered. A new number is generated by a 2-byte counter incrementing by 1. Each sensor (or a central node) sets and manages its own packet numbering sequence. Upon receiving the packet, the receiver has to:

avoid performing a command from a repeat packet, and detect false packets sent by attackers.

Both tasks can be satisfied by filtering the packets by number. The reasons for introducing this type of filtering are:

Attacker's packets:

An attacker might record a user sequence (i.e., a pre-set packet being broadcast) and broadcast it afterwards, or he can record several user sequences and send them in some order imitating a real sequence.

An attacker can jam legitimate packets. For legitimate packets:

The counter may overflow and start again from 0 (65534, 65535, 0, 1, 2 . . . );

The counter may be off-line for some time, and it may change its value unexpectedly. There has to be some mechanism to inform the central node about the current value;

The central node may be reset and lose the sequence (its last value), so counters have to be initialized again;

When a new counter is being initialized, the system should ignore filtering by number, or conduct it in a different way, as we do not know the counter and its value beforehand.

The controlling tasks are performed exclusively by the receiver (or a central node).

All in all, there are three levels of filtering:
1. protection from repeat packets;
2. protection from unauthorized access (authentication);
3. protection from repeat alarms.

Figure 20:
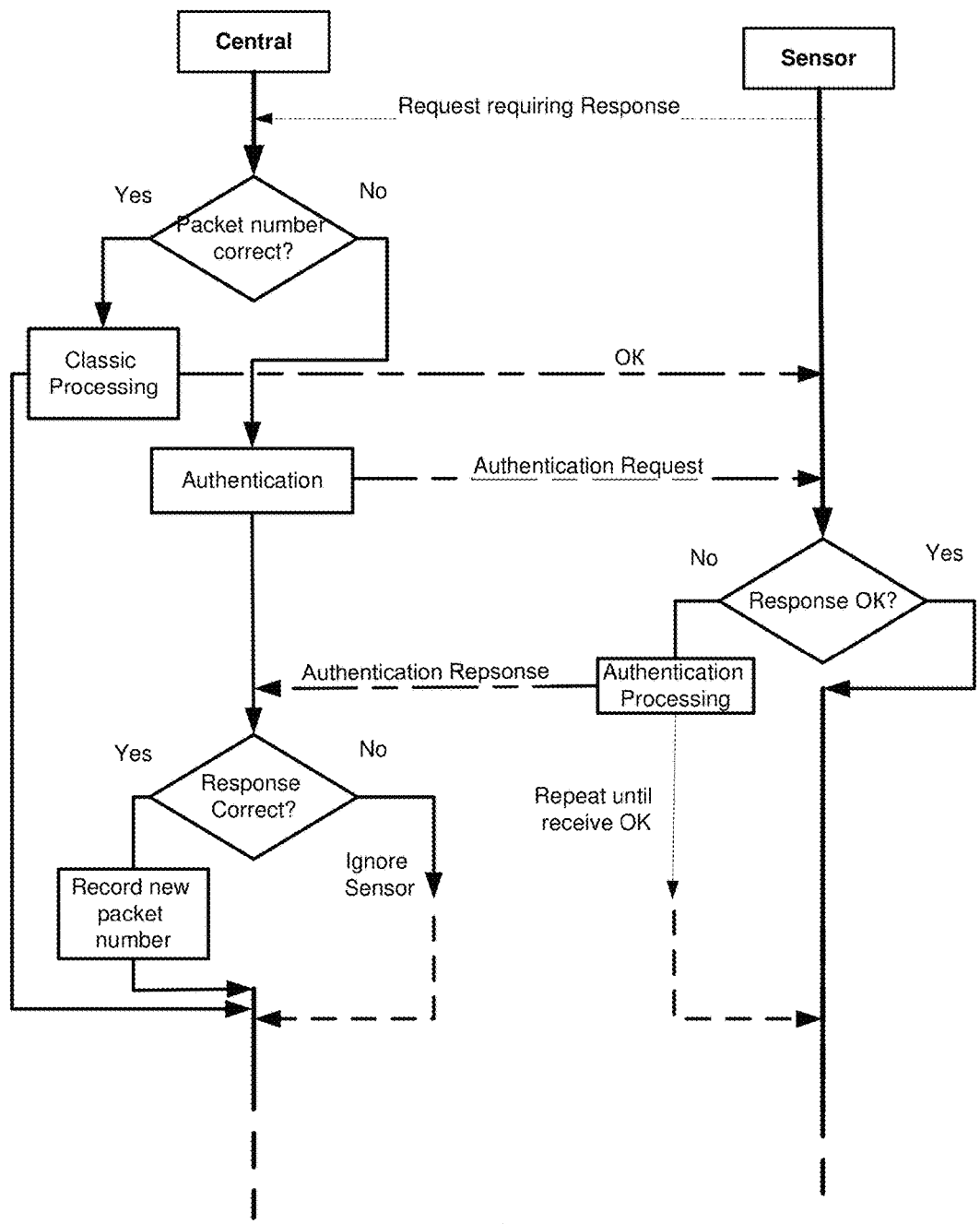
FIG. 20 illustrates an overview of a packet exchange using packet number control, in accordance with the exemplary embodiment.

An overview of a packet exchange using packet number control is provided in FIG. 20.

According to the exemplary embodiment, protection from repeat packets is as follows. After a packet has been processed, its number is stored by a specialized variable for each sensor. Then, if a new packet coincides with the stored one, the system disregards it as a repeat packet (the sensor did not receive confirmation for some reason), just sending confirmation and not processing the packet. FIG. 21A represents a simplified diagram where only repeat packet numbers are described, and FIG. 21B represents a general flowchart, which shows an order of processing. The right-hand branch reflecting the invalid numbers is discussed in detail below.

Note that some commands do not require repetition, which is why the branch concerning repeat replies is actually more difficult, but the essence is the same. Also, some commands require interactive responses (e.g., a message about deletion, a sync error, etc.), which are generated in other program blocks and do not need to be repeated on purpose. In order to take all these possibilities into account, the repeating blocks are distributed throughout the program, for each specific case, but for the sake of simplicity, it is shown only once, since it always performs one and the same function.

According to the exemplary embodiment, protection from unauthorized access (authentication) is implemented as follows. In case the number of the received packet deviates from the expected (e.g., by 10 or more), the authenticity of the sensor has to be checked. Under normal conditions, the difference between consecutive packet numbers is 1 or 2-3 (if the connection is bad). These small deviations are not accounted for, but in case an attacker has recorded a packet and is re-introducing it, the system will be alarmed by a very different packet number, which is either lower than that of the current packet, or deviates by a large amount.

Concurrently, the same may happen if the sensor was reset, or it was off-line for a long time, etc. Thus, in order to differentiate between the packet sent by a "stray" sensor and the repeat packet sent by an attacker, the authentication mechanism is introduced. When the systems detects conflicting packet numbers, it sends the authentication command and some data to the sensor. Upon receiving this command, the sensor must perform an arithmetic operation over the data, returning the result in the reply packet. For its part, the central node conducts the same calculation and matches the results (which must be checked first so that it is not a 0 or a 0xFF, in which case other sets of data should be used).

Figures 22A, 22B:
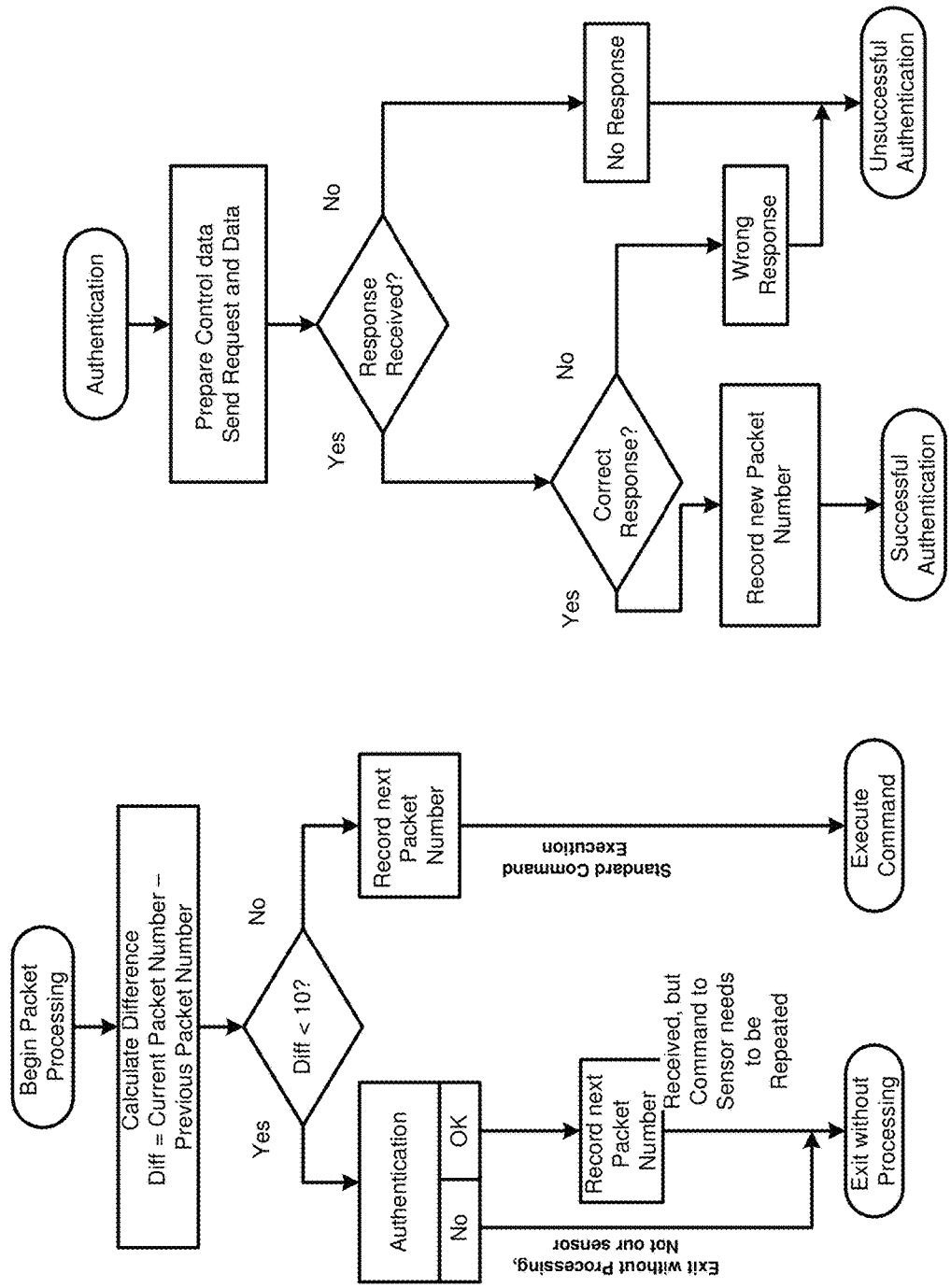
FIG. 22A illustrates a packet control and processing algorithm.
FIG. 22B illustrates the detailed diagram of the authentication algorithm in accordance with the exemplary embodiment.

If the sensor's result is valid, then the central node updates the counter of packets sent by this sensor, and the operation goes on. Otherwise, the sensor will be ignored. Whatever the authentication outcome is, the original packet sent by the sensor to the central node will be ignored as an invalid one, so it will have to be repeated. The data items are not lost, they are simply to be re-sent in the next delivery (depending on the data type, it can be performed in the text time slot or in the next status transfer cycle). A packet control and processing algorithm is depicted in FIG. 22A and the detailed diagram of the authentication algorithm is depicted in FIG. 22B.

Figure 23:
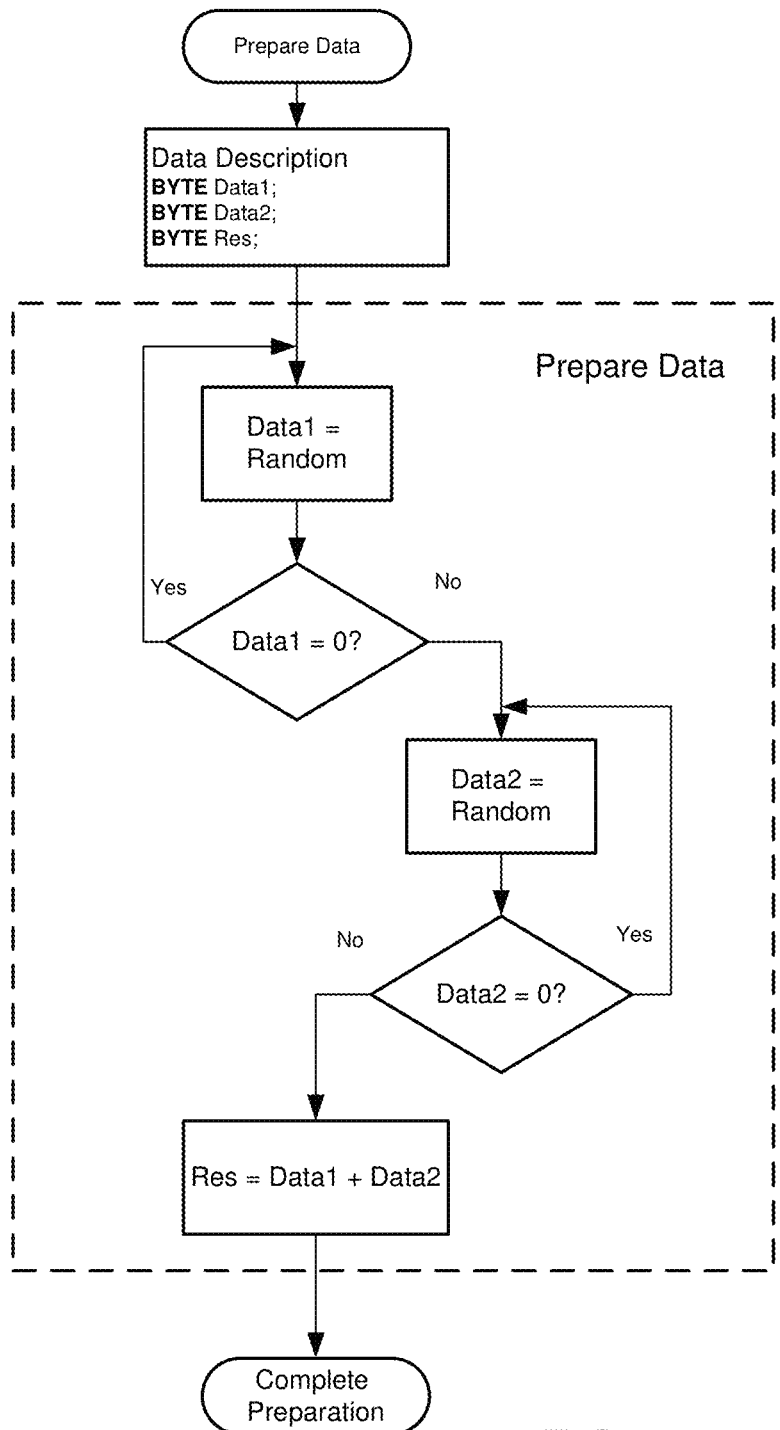
FIG. 23 illustrates data preparation and calculations in accordance with the exemplary embodiment.

According to the exemplary embodiment, to check the data, a simple arithmetic sum is used without shifts, i.e., ignoring the high byte. It is important to make sure that no data was a 0, otherwise it will duplicate the data just sent. The current values of two timers (one for each operand) may be used as a random number generator. Since authentication itself is a relatively random event, then the timer values will be random as well. Data preparation and calculations are shown in FIG. 23.

Figure 24:
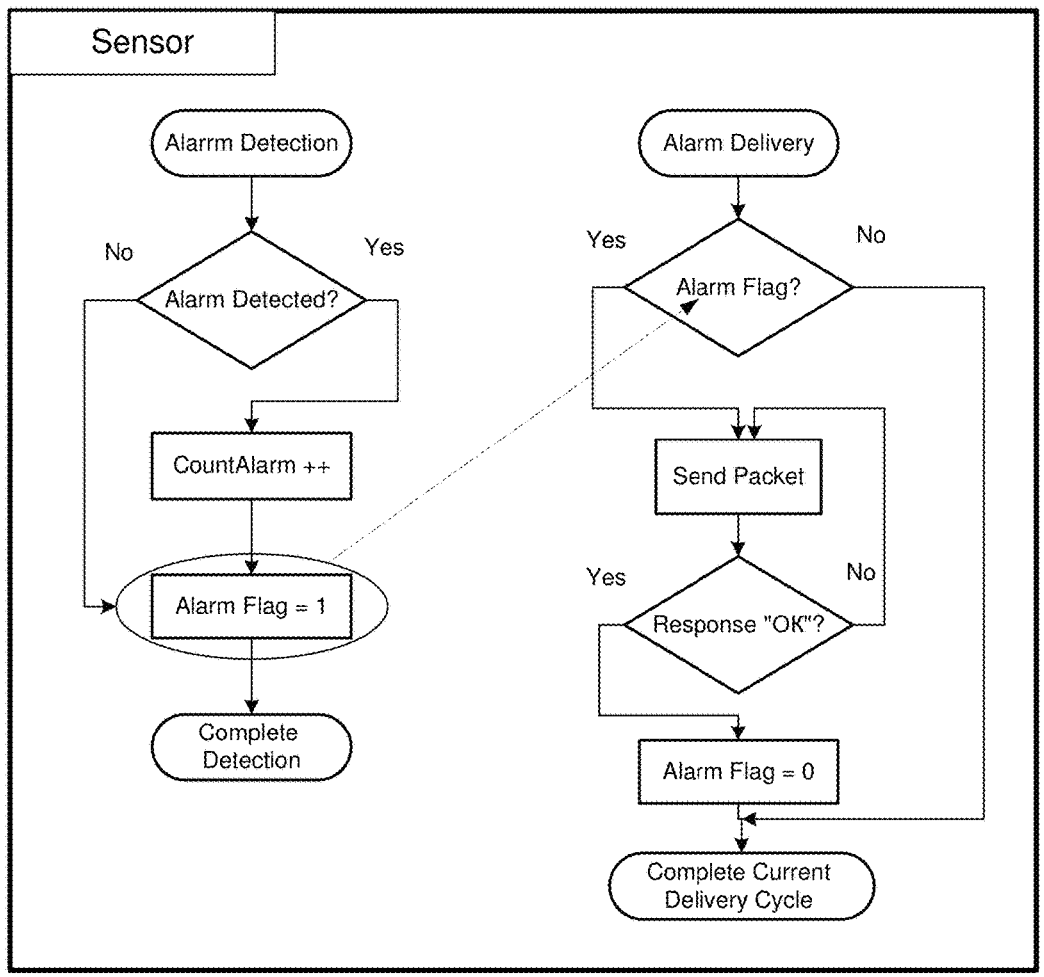
FIG. 24 illustrates an algorithm of sensor's behavior when generating an alarm packet, in accordance with the exemplary embodiment.

Protection from repeat alarms is implemented as follows. Alarms are transmitted using the add-in for protection from repeat alarms. Since alarms can be sent in more than one cycle, with new packet numbers, it is not sufficient to filter them just by the packet number. For additional protection, alarm numbering is used. When a new alarm is detected, the alarm count increases, and the new alarm with its number are transmitted to the central node. The alarm is analyzed, and if it has already been processed, the central node sends a confirmation to the sensor and ignores the alarm. The sensor generating an alarm packet behaves following the algorithm depicted in FIG. 24.

The alarm packet, when generated, is as follows:

The data transmitted in the alarm packet (its data field):

| No | Name | Byte qty | Description |
|----|------|----------|-------------|
| 1 | CountAlarm | 1 | Current incident no. |
| SZ | StateZone | 1 | Immediate static state of indicators monitored by the sensor, at the moment when the command was transmitted |
| FA | FieldAlarms 1-2 | 2 | The alarm flag field, where each flag marks that one or more indicators changed their states since the last checkup. Up to 16 events may be flagged simultaneously. |

Figure 25:
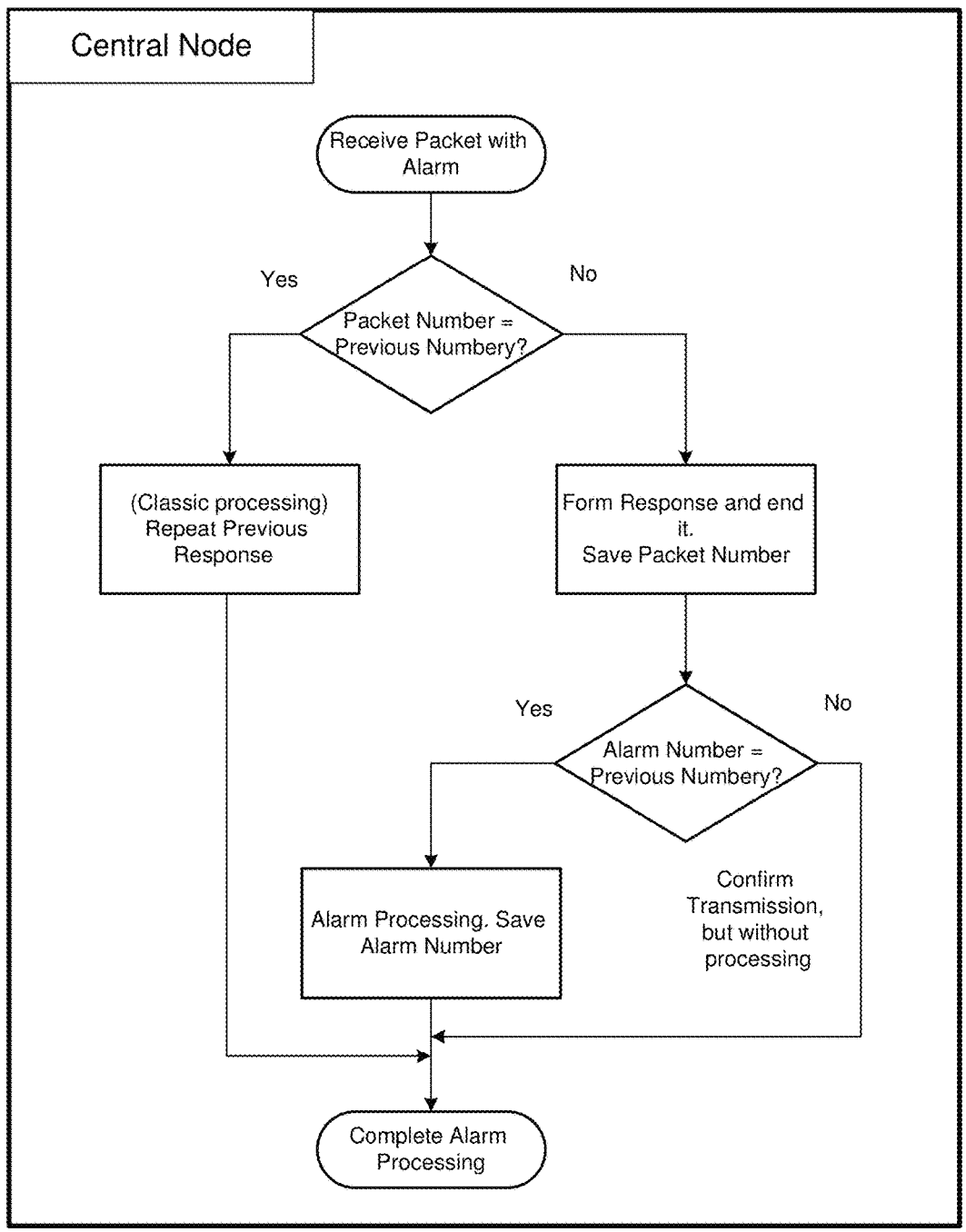
FIG. 25 illustrates a central node behavior algorithm for processing a received alert, in accordance with the exemplary embodiment.

According to the exemplary embodiment, apart from classic processing of repeat packet numbers, the central node also keeps count of alarm numbers, thus preventing one and the same alarm from being processed multiple times. The central node behaves according to the algorithm depicted in FIG. 25.

Figure 1:
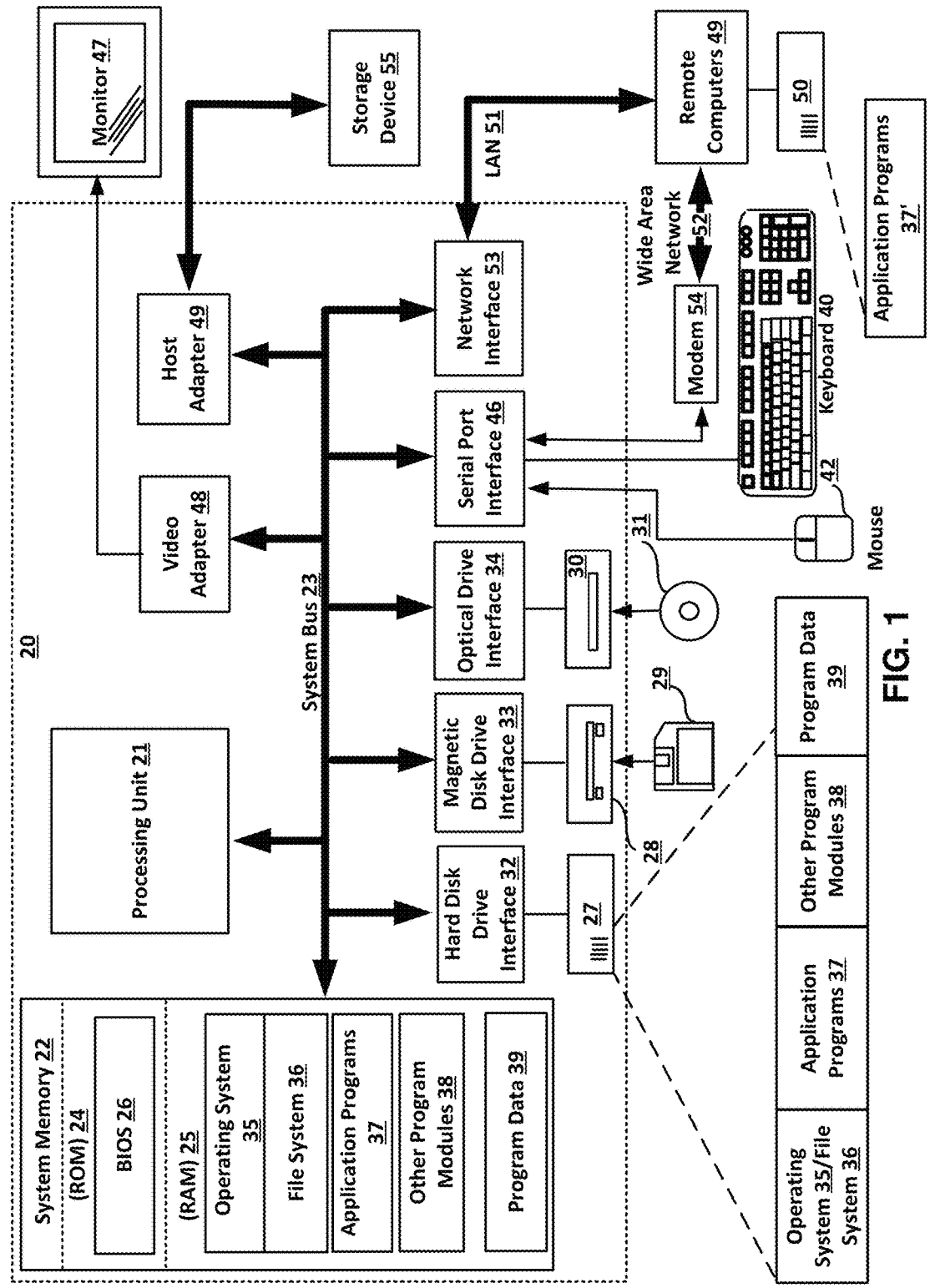
FIG. 1 illustrates an example of a server or hardware node that may be used to implement some aspects of the invention.

With reference to FIG. 1, an exemplary system for implementing the invention includes a general purpose computing device in the form of a host computer/node or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer/node or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the computer/node or server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli

| Field name | NumSensor | ID Sensor_1 | ID Central_h | ID Central_m | ID Central_1 | NumPacket_h | NumPacket_1 |
|---|---|---|---|---|---|---|---|
| Value | XX | XX | YY | YY | YY | NN | NN |
| Field name | | mc_Alarm | CountAlarm | StateZone | FieldAlarms1 | FieldAlarms2 | CRC |
| Value | | 31 | Ca | SZ | FA | FA | ?? | cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The computer/node or server 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The computer/node or server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the computer/node or server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the computer/node or server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer/node or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for long range communications using sensors with bidirectional communication capability, the method comprising:

installing a plurality of sensors configured to communicate with a central node configured to send and receive packets in working slots on two frequencies;

selecting a frequency with the strongest signal from each particular sensor; and avoiding collisions between the two-way sensors by changing working slots of the two-way sensors in each new frame by:

creating a super-frame comprising multiple ordinary frames;

clocking the multiple ordinary frames through;

creating a new super-frame; and pseudorandomly changing the working slot position throughout the new super-frame by shifting the working slots forward by a variable pseudo-random delay, which is set by the central node from a pre-defined range.

2. The method of claim 1, wherein the packets are encrypted.

3. The method of claim 1, wherein receipt of the packets is confirmed by a recipient to a sender.

4. The method of claim 3, wherein the packet includes a header, a command, a data field and a checksum.

5. The method of claim 4, wherein the header includes a packet number, an address of the sender, an address of the recipient.

6. The method of claim 4, wherein the packet includes service data, including a preamble, a sync word, a network number, a data count and a modem checksum.

7. The method of claim 1, wherein the encryption does not change a byte count of the packet.

8. The method of claim 1, wherein a length of the slots is changed pseudorandomly.

9. The method of claim 1, wherein each slot has a work period and a service period, and wherein a length of the work period is changeable at an expense of a length of the service period.

10. The method of claim 1, wherein each sensor operates in a sleep mode, waking up only when its slot is up for broadcast.

11. The method of claim 1, wherein the slots are desynchronized by working interleaving between the frames.

12. The method of claim 1, wherein the working slot is cyclically shifted.

13. The method of claim 1, wherein the packets are repeated at one of the two frequencies.

14. The method of claim 1, wherein the two frequencies change over time.

15. The method of claim 1, wherein the two frequencies are selected using a channel number and a current frame number.

16. The method of claim 1, wherein each sensor manages its own packeting numbering sequence.

17. The method of claim 1, wherein alarms generated by the sensors are numbered.

18. The method of claim 1, wherein, when a conflicting number of the packet from a sensor is detected, an authentication command is sent to the sensor.

19. A system for long range communications using sensors with bidirectional communication capability, the system comprising:

a plurality of sensors configured to communicate with a central node configured to send and receive packets in working slots on two frequencies;

the central node selects a frequency with the strongest signal; and wherein collisions between the two-way sensors are avoided by changing working slots of the two-way sensors in each new frame by:

creating a super-frame comprising multiple ordinary frames;

clocking the multiple ordinary frames through;

creating a new super-frame; and pseudo-randomly changing the working slot position throughout the new super-frame by shifting the working slots forward by a variable pseudo-random delay, which is set by the central node from a pre-defined range.

* * * * *